US007603679B2

(12) United States Patent
Fujimura

(10) Patent No.: US 7,603,679 B2
(45) Date of Patent: Oct. 13, 2009

(54) DISC DEVICE

(75) Inventor: Nobuhiko Fujimura, Tokyo (JP)

(73) Assignee: TEAC Corporation, Tokyo (JP)

( * ) Notice: Subject to any disclaimer, the term of this patent is extended or adjusted under 35 U.S.C. 154(b) by 0 days.

(21) Appl. No.: 12/082,357

(22) Filed: Apr. 10, 2008

(65) Prior Publication Data
US 2008/0201730 A1 Aug. 21, 2008

Related U.S. Application Data

(62) Division of application No. 10/888,448, filed on Jul. 9, 2004, now Pat. No. 7,401,341.

(30) Foreign Application Priority Data

| Jul. 11, 2003 | (JP) | ............................. 2003-195960 |
| Aug. 29, 2003 | (JP) | ............................. 2003-209761 |
| May 19, 2004 | (JP) | ............................. 2004-149303 |

(51) Int. Cl.
G11B 17/04 (2006.01)
(52) U.S. Cl. .................................... 720/622
(58) Field of Classification Search ............... 720/622, 720/620, 619, 639, 600, 601, 604
See application file for complete search history.

(56) References Cited

U.S. PATENT DOCUMENTS

| 4,523,306 | A | 6/1985 | Staar |
| 4,682,320 | A | 7/1987 | d'Alayer de Costemore d'Arc |
| 4,831,476 | A | 5/1989 | Branc et al. |
| 4,937,806 | A | 6/1990 | Babson et al. |
| 5,953,303 | A | 9/1999 | Sugano et al. |
| 6,256,280 | B1 | 7/2001 | Sakurai et al. |
| 6,411,582 | B1 | 6/2002 | Nakatani et al. |
| 6,463,025 | B1 | 10/2002 | Scholz |
| 6,512,730 | B1 | 1/2003 | Lee et al. |
| 6,826,766 | B2 | 11/2004 | Tuchiya |
| 7,020,883 | B2 * | 3/2006 | Takai et al. .................. 720/607 |
| 7,057,921 | B2 * | 6/2006 | Valet .......................... 365/158 |
| 7,065,773 | B2 | 6/2006 | Azai |
| 7,088,609 | B2 * | 8/2006 | Valet .......................... 365/158 |

(Continued)

FOREIGN PATENT DOCUMENTS

JP 61 137265 6/1986

(Continued)

Primary Examiner—Allen T Cao
(74) Attorney, Agent, or Firm—Weingarten, Schurgin, Gagnebin & Lebovici LLP

(57) ABSTRACT

When a disc is loaded in or unloaded from a disc device, even if the disc is pushed in the direction opposite to the transmission direction by external force to return or is pulled to return, it is possible to prevent the mechanism that transmits the disc from being damaged and to improve the reliability of the disc device. In a disc device for loading the disc inserted by the pivoting of the arm mechanism therein and for unloading the disc accommodated therein to the outside thereof, a lock mechanism, by which a lock state in which driving force for pivoting the arm mechanism is transmitted from a driving mechanism is released when force more than a predetermined amount is applied to the arm mechanism in the loading direction of the disc or in the unloading direction of the disc, is formed.

2 Claims, 40 Drawing Sheets

U.S. PATENT DOCUMENTS

| | | |
|---|---|---|
| 2003/0048743 A1 | 3/2003 | Guion et al. |
| 2003/0174628 A1* | 9/2003 | Takai et al. ............... 369/77.1 |
| 2006/0064711 A1 | 3/2006 | Chang |
| 2006/0192237 A1* | 8/2006 | Huai ........................ 257/296 |
| 2007/0300246 A1* | 12/2007 | Omori et al. ............... 720/690 |

FOREIGN PATENT DOCUMENTS

| | | |
|---|---|---|
| JP | 11 167758 | 6/1999 |
| JP | 2002-352498 | 12/2002 |
| JP | 2003-109273 | 4/2003 |

* cited by examiner (A)

(B)

(C)

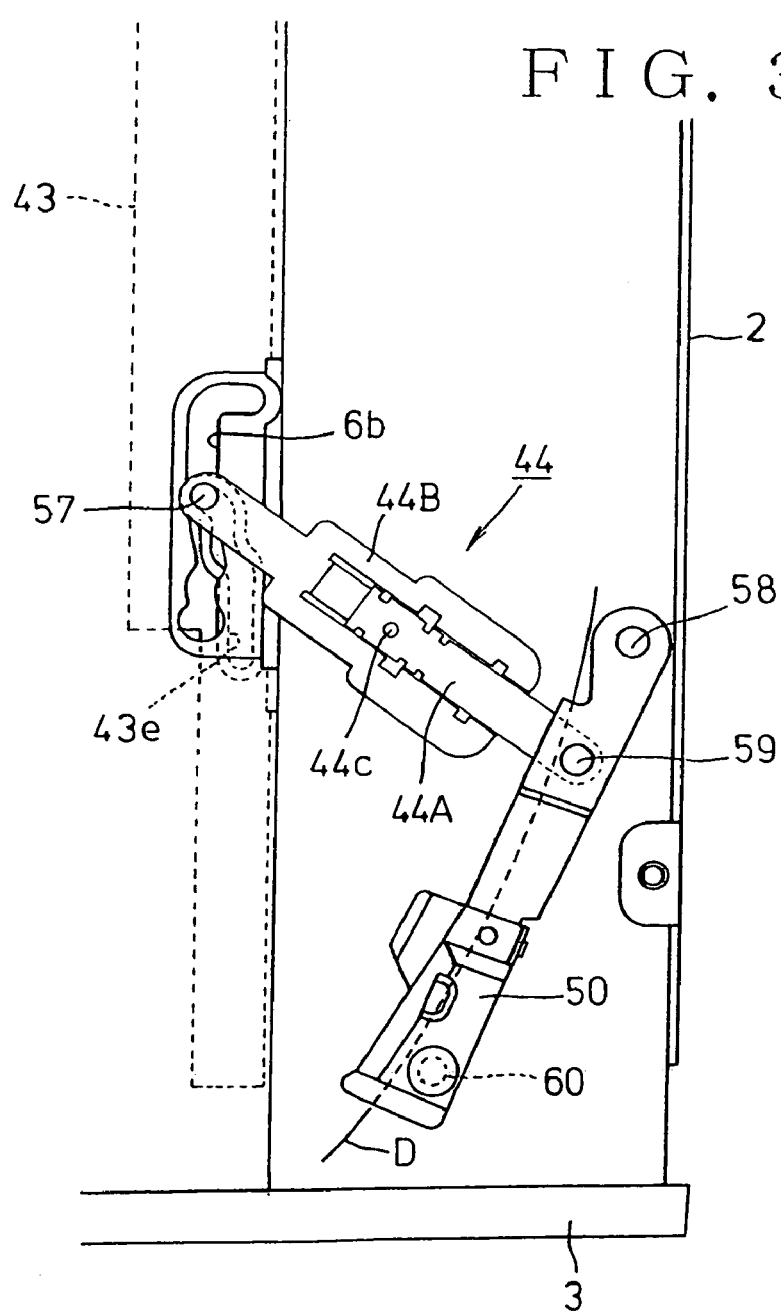
FIG. 35
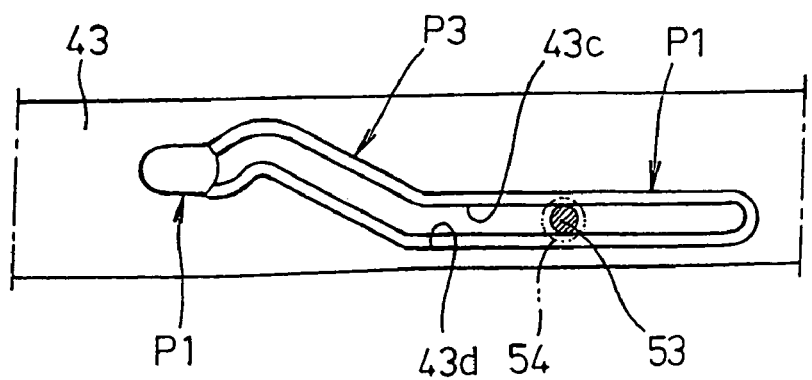

Prior Art

Prior Art

DISC DEVICE

CROSS-REFERENCE TO RELATED APPLICATION

This application is a divisional application under §1.53(b) of prior application Ser. No. 10/888,448 filed Jul. 9, 2004, entitled: DISC DEVICE.

BACKGROUND OF THE INVENTION

1. Field of the Invention

The present invention relates to a disc device for driving optical discs (such as CD-R/RW and DVD-R/-RW/RAM/+R/+RW) as a recording medium for recording a large amount of information in information processing apparatuses such as various computer systems.

2. Description of the Related Art

Generally, disc devices built into personal computers (hereinafter, referred to as PCs) comprise disc trays for loading discs, such that the disc trays proceed into and retract from the disk devices. The discs placed on the disc trays are driven in the main bodies of the disc devices to record information or to reproduce information.

On the other hand, disc devices having a slot (not being implemented with the disk trays) are also widely used to make the PCs thinner and smaller. According to this type of disc devices, since the disc trays are not used when the discs are loaded in or unloaded from the main bodies of the disc devices, when an operator inserts a disc by half or more into a slot, the loading mechanism of the main body operate such that the disc is automatically loaded.

FIGS. 46 and 47 illustrate the structure and the operation of a loading mechanism in a conventional disc device implemented with a slot-in method. According to the structure illustrated in FIGS. 46 and 47, when an operator inserts a disc D, the vertical and horizontal positions of the disc D are controlled by a pin 100a at the tip of a first pivoting body 100, right and left guide bodies 101 and 102, and a pin 103a at the tip of a second pivoting body 103 in the middle of the process, such that the disc D reaches the position illustrated in FIG. 46.

At this time, the pin 100a at the tip of the first pivoting body 100 is pressed by the disc D, such that the first pivoting body 100 pivots in the direction marked with an arrow 100A. Also, the pin 103a at the tip of the second pivoting body 103 is pressed by the disc D, such that the second pivoting body 103 pivots in the direction marked with an arrow 103A. A switch lever 104 is pressed by the end of the second pivoting body 103, such that the switch lever 104 pivots in a direction marked with an arrow 104A to operate a detection switch 105.

When the detection switch 105 operates, driving means 106 is driven, such that a first slide member 107 starts to move in the direction marked with an arrow 107A. Since the tips of the first slide member 107 and a second slide member 108 are connected to each other by a slide connecting member 109 that is supported by a pin 110 to pivot, the second slide member 108 proceeds in the direction marked with an arrow 108A in synchronization with the recession of the first slide member 107.

Accordingly, when the first slide member 107 starts to retract, since a driven pin 100b of the first pivoting body 100 supported to the slide member 107 in a cantilever state is guided in a cam groove 107a of the first slide member 107, the pivoting body 100 rotates in the direction marked with an arrow 100B around a support point 100c. Accordingly, the pin 100a at the tip of the first pivoting body 100 returns the disc D in the direction marked with the arrow 107A until the disc D abuts on pins 111a and 111b of a disc position determining member 111.

At this time, since the pin 103a of the second pivoting body 103 pivots in the direction marked with the arrow 103A, the pin 103a of the second pivoting body 103 moves in the direction marked with the arrow 103A while supporting the disc D in synchronization with the pin 10a located at the tip of the first pivoting body 100 and rotates to the position slightly remote from the disc D after the disc D abuts on the pins 111a and 111b of the disc position determining member 111.

The loading mechanism operates as mentioned above when the disc D is loaded in the device and operates in reverse to the above when the disc D is unloaded to the outside of the device. That is, as illustrated in FIG. 47, in the case where the disc D is in a prescribed position in the device, when the driving means 106 is driven in a reverse direction in accordance with an unload command, the first slide member 107 starts to proceed in the direction marked with an arrow 107B, and the second slide member 108 connected to the slide connecting member 109 starts to retract in the direction marked with an arrow 108B in synchronization with the procession of the first slide member 107. Accordingly, since the first pivoting body 100 pivots in the direction marked with the arrow 100A and the second pivoting body 103 pivots in the direction marked with the arrow 103B, the disc D is supported by the pins 100a and 103a at the tips of the first pivoting body 100 and the second pivoting body 103 and is unloaded to the outside of the device.

Also, the disc D loaded in the device is clamped by a clamp head 112 that is in an up and down motion in the exact position. The clamp head 112 is integrated with a turntable 113 fixed to the driving shaft of spindle motor 114 that is arranged in a frame 115, such that the frame 115 is movable in vertical direction by an ascending and descending mechanism.

When the disc D is unloaded, since the pivoting body 103 is unlocked from the driving means 106, such that the pivoting body 103 operates independent of the driving means 106, the pivoting body 103 pivots in the direction marked with the arrow 103B by the elastic supporting force of a spring to unload the disc D. Thus, since the elastic force of the spring is the only the driving force for unloading the disc D, the halting position of the disc D unloaded to the outside of the device is not always constant and the disc D is often unloaded to the outside of the device while rotating (for example, the patent document 1).

[Patent Document 1]

Gazette of Japanese Unexamined Patent Application Publication No. 2002-117604

According to the disc device having the above-mentioned structure, in order to make the first pivoting body 100 and the second pivoting body 103 operate in a cooperative manner, the first slide member 107 and the second slide member 108 are connected to each other by the slide connecting member 109, such that the second slide member 108 proceeds in synchronization with the recession of the first slide member 107. When the disc D is unloaded to the outside of the device, the force toward the direction marked with the arrow 103B of the second pivoting body 103 is mainly applied.

In the state when the disc D is unloaded to the outside of the device, that is, in the state when the disc D is in the position illustrated by an imaginary line and the second pivoting body 103 rotates in the direction marked with the arrow 103B as illustrated in FIG. 46, and when the disc D is pushed in the direction where the disc D is loaded and returns, the force in a negative direction is generated against force in a positive direction, which normally operates, such that the entire loading mechanism is in the reverse motion to damage the respective portions and the driving means 106.

In the state when the disc D is loaded in the device, that is, in the state when the disc D is in the position illustrated by an imaginary line and the first pivoting body 100 pivots in the direction marked with the arrow 108B as illustrated in FIG. 46, and when the disc D is pulled in the direction where the disc D is unloaded and returns, the entire loading mechanism is in the reverse motion to damage the respective portions and the driving means 106.

Such a problem is mainly caused by careless handling of the disc D by an operator, and it is required for the operator to carefully handle the disc D. In the case when the operator poorly handles information processing apparatuses such as a PC or when the operator desires to stop the unloading of the disc in the middle of the process, undesirable load may be applied to the loading mechanism. When the operator instinctively returns the disc exposed to the outside of the device or when part of the body of the operator happens to touch the disc unloaded and exposed to the outside of the device to damage the loading mechanism. Also, when the disc is loaded in the main body of the device, when the operator stops the loading of the disc in the middle of the process, the operator may instinctively grab the end of the disc that is being loaded in the main body or pull the end of the disc to retrieve the disc from the device.

When such operations are performed, according to the above-mentioned loading mechanism in a conventional disc device being implemented with a slot-in method, since the pivoting body in the portion that loads and unloads the disc is in a cantilever state, even if a slight amount of force is applied to the tip of the portion that loads and unloads the disc, strong angular moment is generated at the end, such that the force in the negative direction, which is more than ten times the force required for unloading the disc, may be generated to easily damage the loading mechanism. Thus, in order to solve such a problem, as means for protecting the loading mechanism from abnormal operations, it was tried to improve the strength of the loading mechanism, to optimize the output of the driving portion, and to detect the load. However, it is still difficult to overcome the above problem in spite of the increased manufacturing cost, complicating of the loading mechanism, and increasing the weight.

SUMMARY OF THE INVENTION

In order to solve the problems, as mentioned above, it is an object of the present invention to provide a disc device capable of preventing a loading mechanism from being damaged, thus improving the reliability of the loading mechanism of the disc device even if a disc is pushed in the direction where the disc is loaded and returns or is pulled in the direction where the disc is unloaded and returns.

Also, it is another object of the present invention to provide a disc device having a disc-supporting arm that firmly grabs the disc loaded from a slot, such that the problems prevalent in the loading mechanism of the disc devices implemented with a slot-in method can be solved.

Thus, according to a first aspect of the present invention, in order to achieve; the objects, there is provided a disc device for loading a disc being inserted, by a pivoting of an arm mechanism, inside the disc device, and unloading the disc from the disc device, in which the disc device comprises a locking mechanism for releasing a locked state, in the locked state where a driving force for pivoting the arm mechanism is transmitted from a driving mechanism, when a force greater than a predetermined force is applied to the arm mechanism in a loading direction or an unloading direction.

According to a second aspect of the present invention, a disc device comprises a disc supporting arm for guiding a disc into the disc device in a disc loading direction by supporting a front end of the disc during a loading of the disc, and for pushing the disc out from the disc device in a disc unloading direction during an unloading of the disc, a driving mechanism of the disc supporting arm, and a locking mechanism making the disc supporting arm unlock state with respect to the driving mechanism during the loading of the disc, and making the disc supporting arm lock state with respect to the driving mechanism during the unloading of the disc.

According to a third aspect of the present invention, a disc device comprises a disc supporting arm for guiding a disc into the disc device in a disc loading direction by supporting a front end of the disc during a loading of the disc, and for pushing the disc out from the disc device in a disc unloading direction by supporting a rear end of the disc during an unloading of the disc, a driving mechanism of the disc supporting arm, and a locking mechanism for releasing a locked state of the disc supporting arm and the driving mechanism, in the locked state of the disc supporting arm with respect to the driving mechanism during the unloading of the disc, when a force greater than a predetermined force is applied to the disk supporting arm in a loading direction.

According to a fourth aspect of the present invention, a disc device comprises a disc supporting arm for guiding a disc into the disc device in a disc loading direction by supporting a front end of the disc during, a loading of the disc, and for pushing the disc out from the disc device in a disc unloading direction by supporting a rear end of the disc during an unloading of the disc, wherein, in a state where the loading of the disc is at a standby, an end of the disc being inserted from a slot is firmly accommodated by pressing the disc supporting arm down.

According to a fifth aspect of the present invention, a disc device comprises an introducing arm for supporting a rear end of a disc in a loading direction of the disc and guiding the disc into the disc device, a driving mechanism of the introducing device, and a locking mechanism provided with an extendable and contractable lever arm for transmitting a driving force of the driving mechanism to the introducing arm, in which a reference length of the lever arm in a normal state of the disc device is locked.

According to a sixth aspect of the present invention, a disc device comprises an introducing arm for supporting a rear end of a disc in a loading direction of the disc and guiding the disc into the disc device, a driving mechanism of the introducing device, and an extendable and contractable lever arm for transmitting a driving force of the driving mechanism to the introducing arm, wherein, when a force greater than a predetermined force is applied to the introducing arm in a locked state where a reference length of the lever arm in a normal state of the disc device is locked, the locked state of the reference length of the lever arm is released.

According to a seventh aspect of the present invention, a disc device comprises a disc supporting arm for guiding a disc into the disc device in a disc loading direction by supporting a front end of the disc during a loading of the disc, and for pushing the disc out from the disc device in a disc unloading direction by supporting a rear end of the disc during an unloading of the disc, an introducing arm for supporting a rear end of the disc in the loading direction of the disc and guiding the disc into the disc device, and a driving mechanism for driving the disc supporting arm and the introducing arm, wherein, in a locked state where a driving force of the driving mechanism is transmitted to the disc supporting arm and the introducing arm, the locked state is released when a force greater than a predetermined force is applied to the disc supporting arm or the introducing arm.

According to the disc device having implemented with a slot-in method of a first aspect of the present invention, since the locking device for releasing the locked state of the driving force transmitted to the arm mechanism that loads and unloads the disc is formed, even if force greater than a predetermined level is applied to the arm mechanism during the operation of the device, it is possible to prevent the device from the damages related to the loading of the disc.

According to the disc device having implemented with a slot-in method of a second aspect or third aspect of the present invention, even if the disc unloaded to the outside of the device is pushed and returns due to various causes, it is possible to prevent the device from the damages related to the loading of the disc, and to improve the reliability of the loading mechanism of the disc device. Also, since almost all the unloading operations are controlled by employing the above-described structure, the unloading operation is always uniform, such that the state where the disc is exposed from the slot of the bezel and stopped is always uniform, when the unloading of the disc is finished.

According to the disc device having implemented with a slot-in method of fourth aspect of the present invention, since the end of the disc being inserted from the slot is surely held by pressing the disc supporting arm down, at a standby state of the loading of the disc, the cause which attributes to the device malfunction during the process of loading of the disc can be eliminated.

According to the disc device having implemented with a slot-in method of fifth aspect, or sixth aspect of the present invention, even if the disc is pulled and returned in the unloading direction during the process of loading the disk, the mechanism related to the loading of the disc is prevented from being damaged. Hence, the reliability for the disc device can be enhanced.

According to the disc device having implemented with a slot-in method of seventh aspect of the present invention, because the mechanism related to the loading of the disc can be prevented from being damaged during the loading and unloading operations, the present invention provides a high quality disc device.

BRIEF DESCRIPTION OF THE DRAWINGS

FIG. 35 is a view illustrating a second process of the operation of the introducing arm;

DESCRIPTION OF THE PREFERRED EMBODIMENT

Preferred embodiments of the present invention will now be described with reference to the drawings. Also, in order to facilitate the understanding of the present invention, the entire structure will be schematically described.

Figure 1:
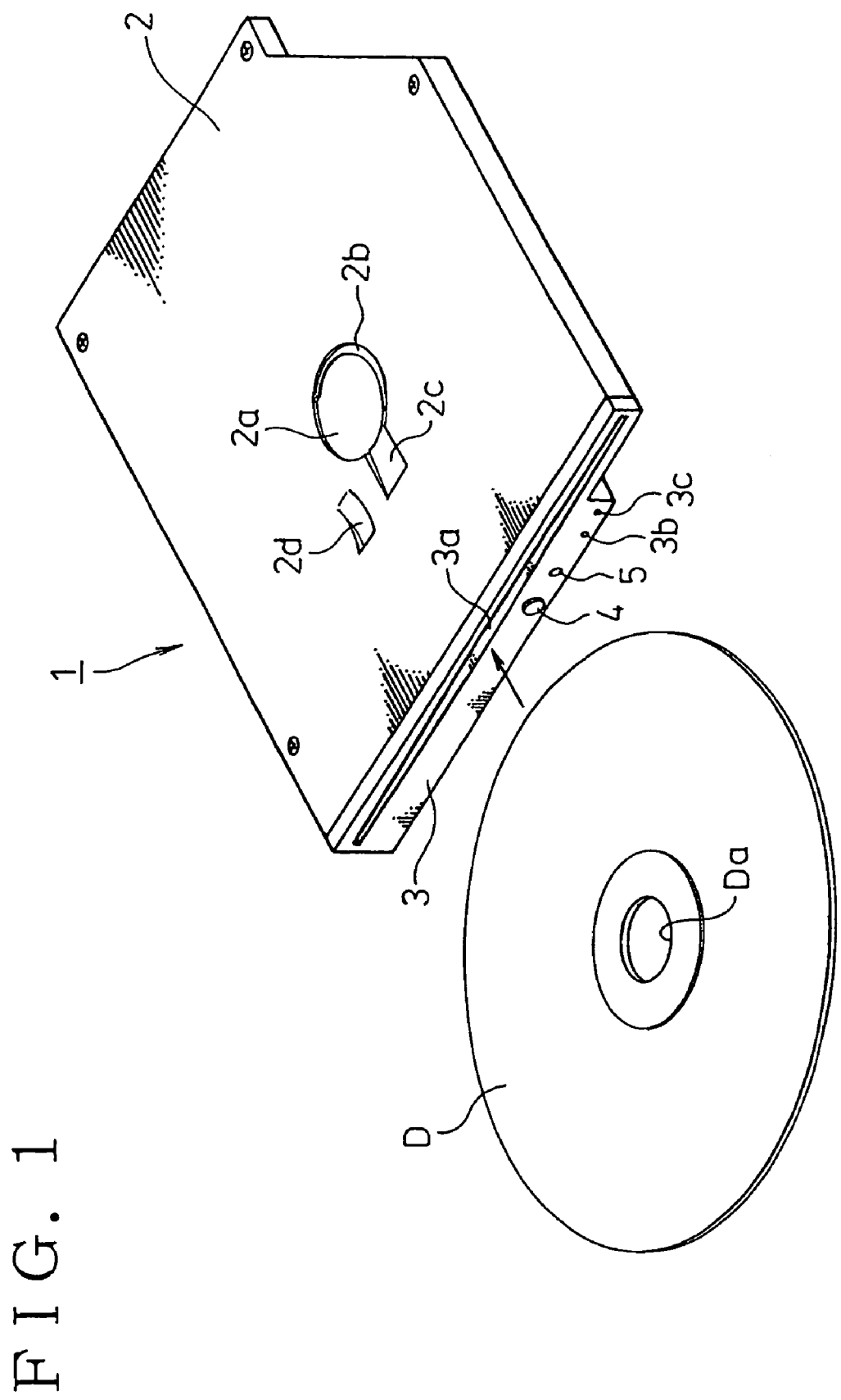
FIG. 1 is a perspective view illustrating the external appearance of a disc device according to the present invention.

FIG. 1 is a view illustrating the external vies of a disc device 1 having implemented with a slot-in method according to the present invention. An opening 2a is formed in the center of the top plate of a sealed chassis case 2. A convex portion 2b that protrudes inside is formed at the circumferential portion of the opening 2a. A first inclined surface 2c of an ascending gradient (a descending gradient on the back) that is connected to the convex portion 2b and that faces the front end is formed in the convex portion 2b. Also, a second inclined surface 2d that guides the up and down motion of a disc supporting arm, to be mentioned later, is formed.

A bezel 3 is fixed to the front end of the chassis case 2. A slot 3a into which a disc D is inserted and through holes 3b and 3c for canceling emergency are formed in the bezel 3. The bezel 3 includes a push button 4 for commanding the accommodated disc D to be unloaded to the outside of the device and an indicator 5 for displaying the operating of the disc device 1.

Figure 2:
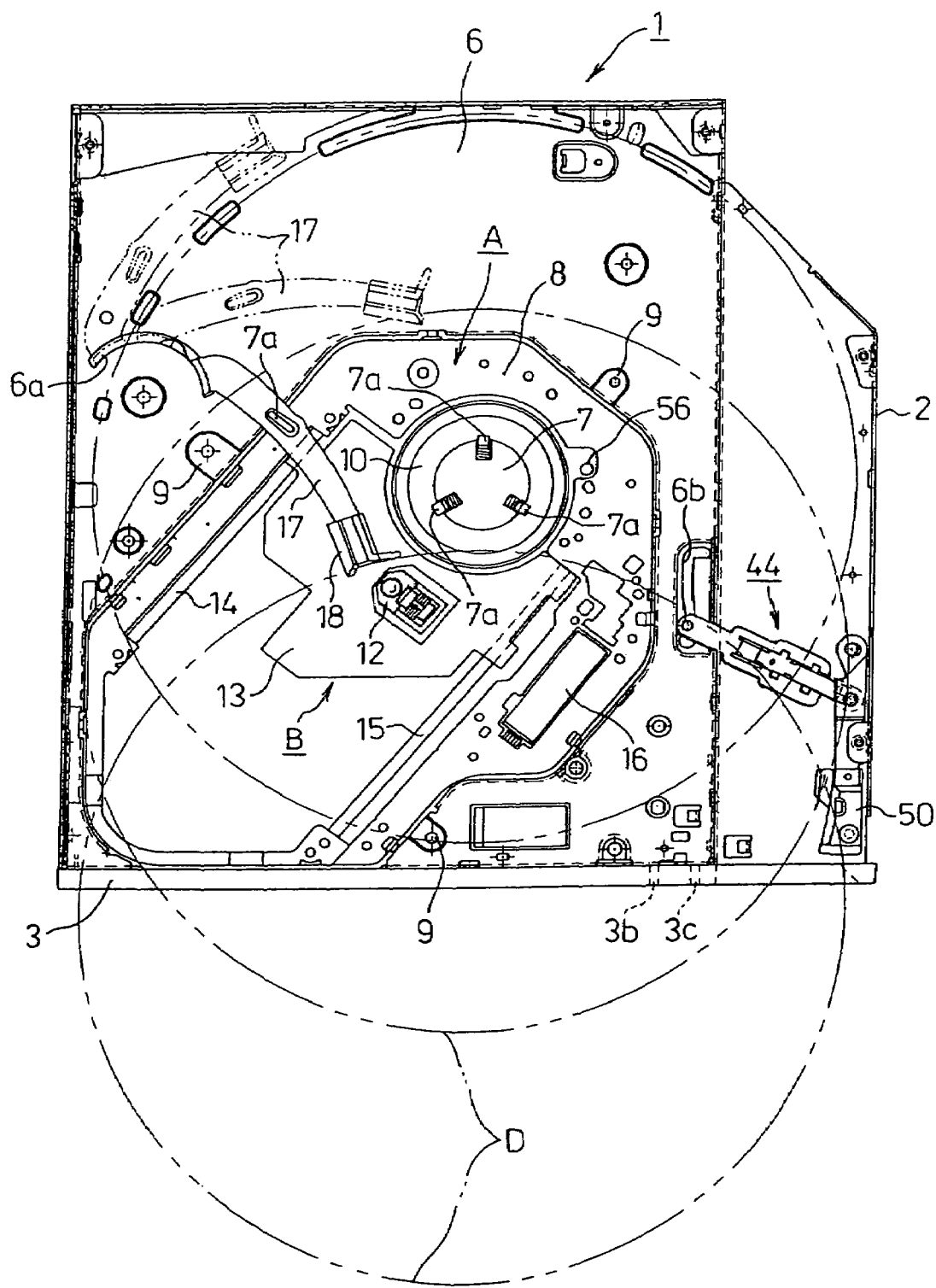
FIG. 2 is a plan view illustrating the internal structure of the disc device of FIG. 1.
Figure 3:
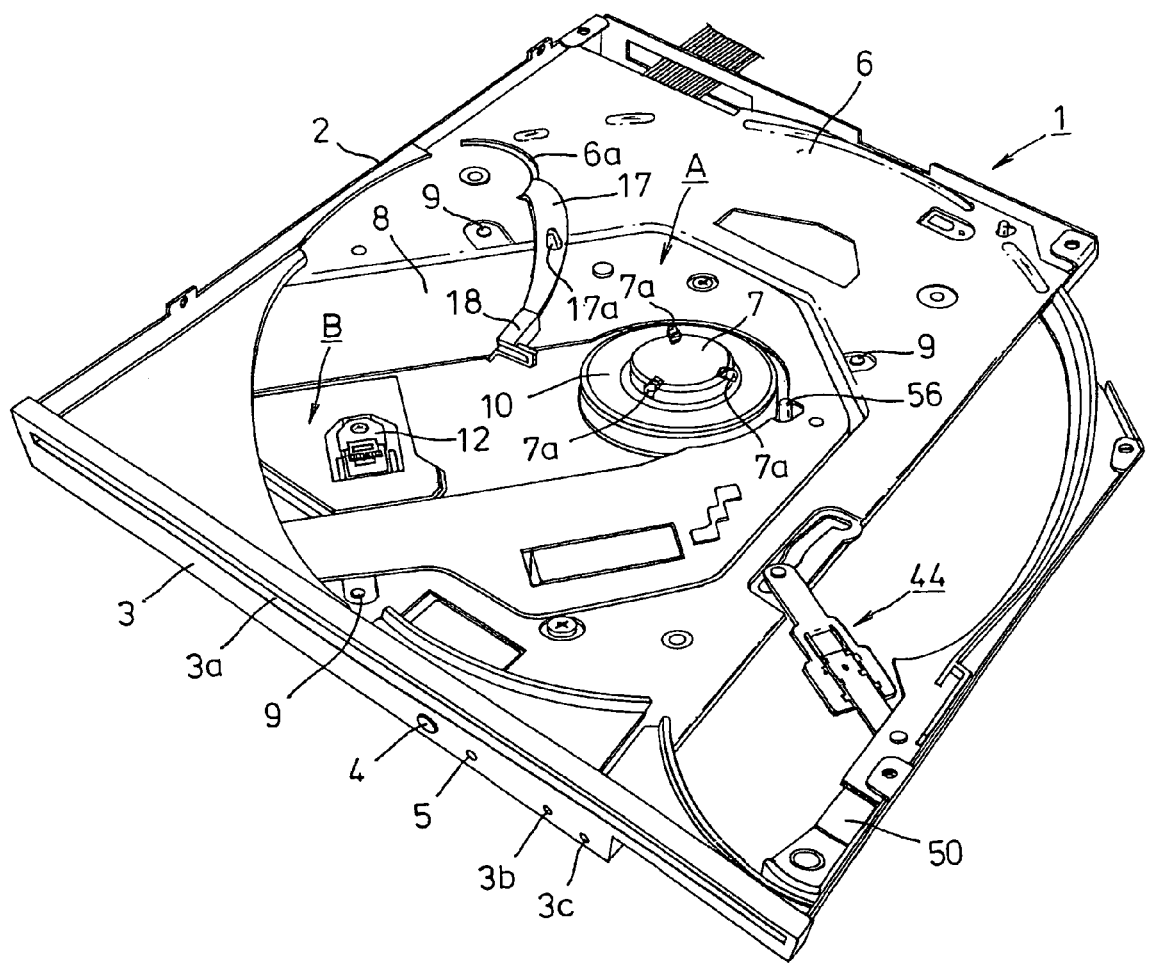
FIG. 3 is a perspective view illustrating the internal structure of the disc device of FIG. 1.

FIG. 2 is a plan view illustrating a state in which the top plate of the chassis case 2 of the disc device 1 is removed. FIG. 3 is a perspective view illustrating the state in which the top plate of the chassis case 2 of the disc device 1 is removed. In FIG. 2, a base panel 6 is arranged in the chassis case 2. A driving unit A for driving the disc D is obliquely arranged from the center of the chassis case 2 toward the lower side of the chassis case 2. In the driving unit A, a frame member 8 that is in the up and down motion in a horizontal state in order to clamp the central hole Da of the disc D or to cancel the clamped state is connected to the base panel 6 in a plurality of places (three places according to the present embodiment) by buffering and supporting structures 9 (refer to FIG. 4). According to an aspect of the driving structure of the frame member 8, one end of the frame member 8 is axially supported, which is in a cantilever state, and the tip of the frame member 8 pivots, such that a clamp head is in the up and down motion. However, according to the present embodiment, the frame member 8 is in the up and down motion in the horizontal state, which is advantageous to making the device thin.

A clamp head 7 is arranged at the tip of the frame member 8 in the position corresponding to the center of the disc D that is loaded and halted. The clamp head 7 is integrated with a turntable 10 and is fixed to the driving shaft of a spindle motor 11 arranged under the turntable 10. The disc D clamped by the clamp head 7 is rotated by the spindle motor 11, such that information is recorded in or reproduced from the disc D.

Next, the reference numeral B denotes a head unit supported to the frame member 8. A carrier block 13 for making an optical pick-up 12 in a reciprocating motion in the direction of the diameter of the disc D is supported by guide shafts 14 and 15 whose both ends are fixed to the frame member 8, such that the carrier block 13 is in the reciprocating motion by a thread motor 16 and a gear unit (not shown).

Figure 6:
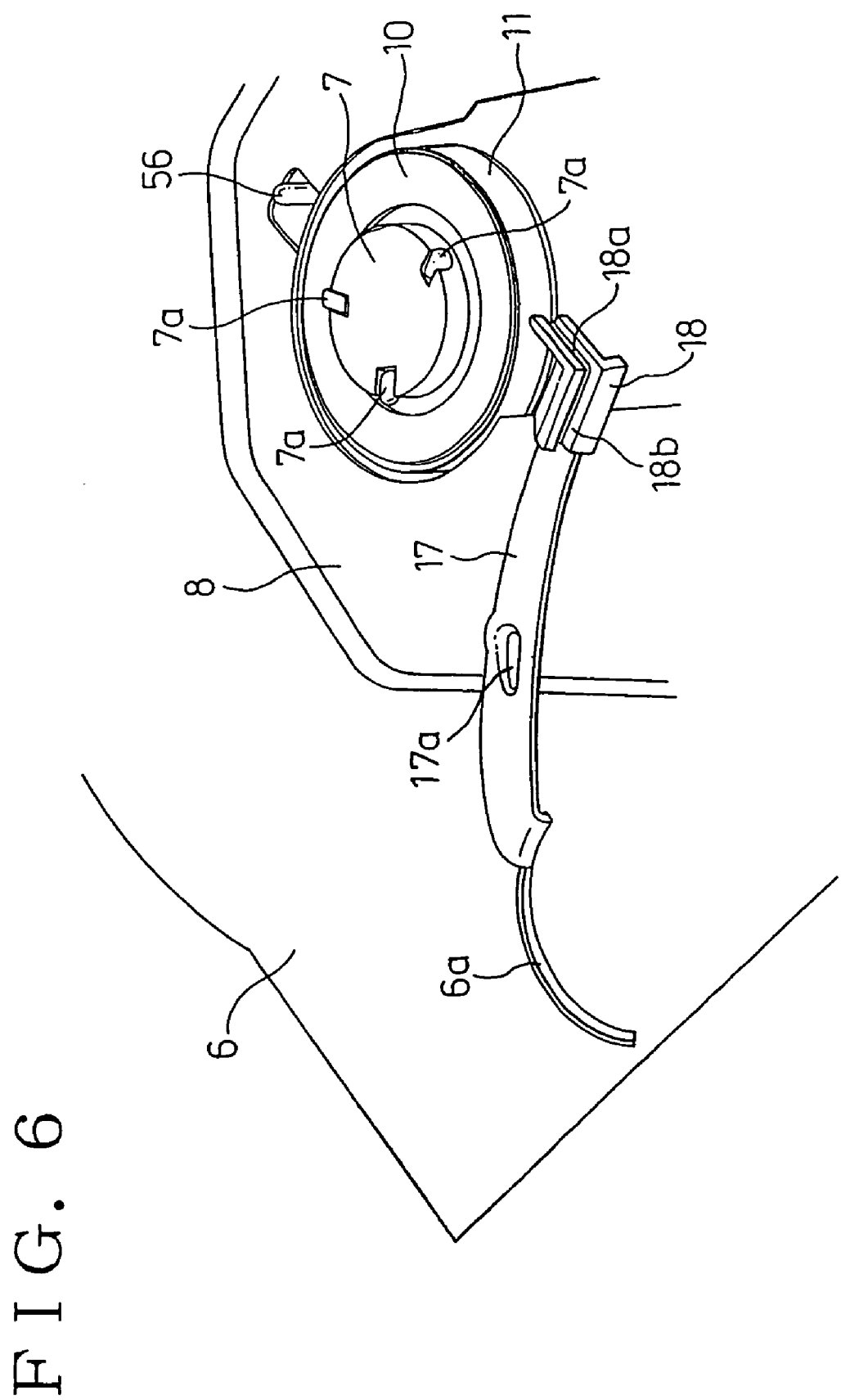
FIG. 6 is a perspective view illustrating the structure of a disc supporting arm.

The reference numeral 17 denotes a disc supporting arm that guides the disc D to the inside of the device and that pulls the disc D to the outside of the device. A holder 18 that supports the end of the disc D is fixed to the tip of the disc supporting arm 17. As illustrated in FIG. 6, an end holding portion 18a is formed at the tip of the holder 18 and a maintaining groove 18b is formed on the side of the holder 18. The entire holder 18 is made of a material with a high friction coefficient, or silicon rubber is attached to the end holding portion 18a and to the maintaining groove 18b such that friction resistance is applied to the disc D. The detailed operation will be mentioned later.

Figure 7:
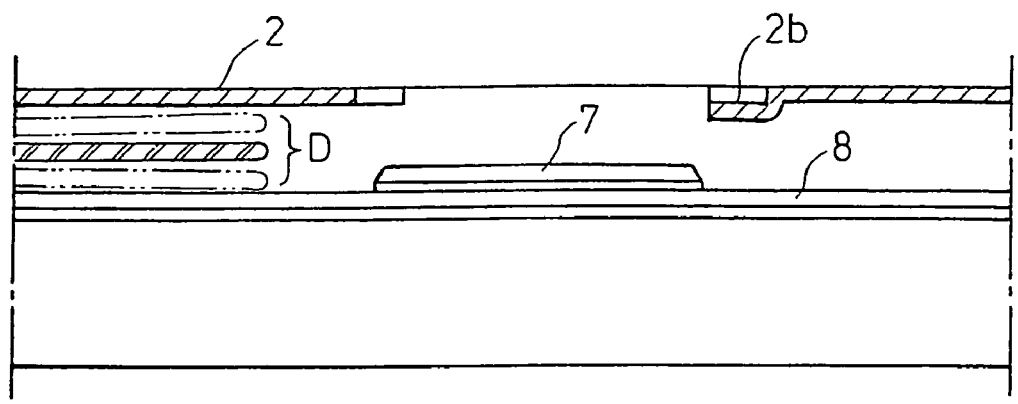
FIG. 7 is a view illustrating the loading of the disc.
Figure 7:
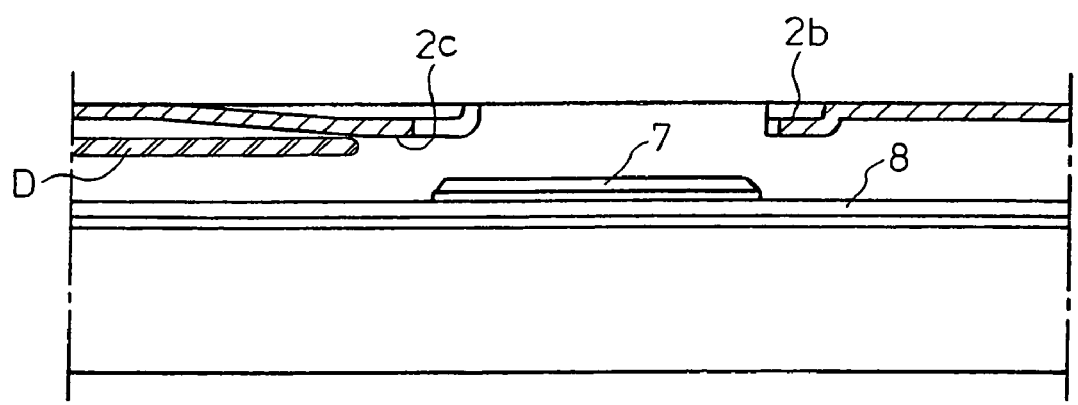
Figure 7:
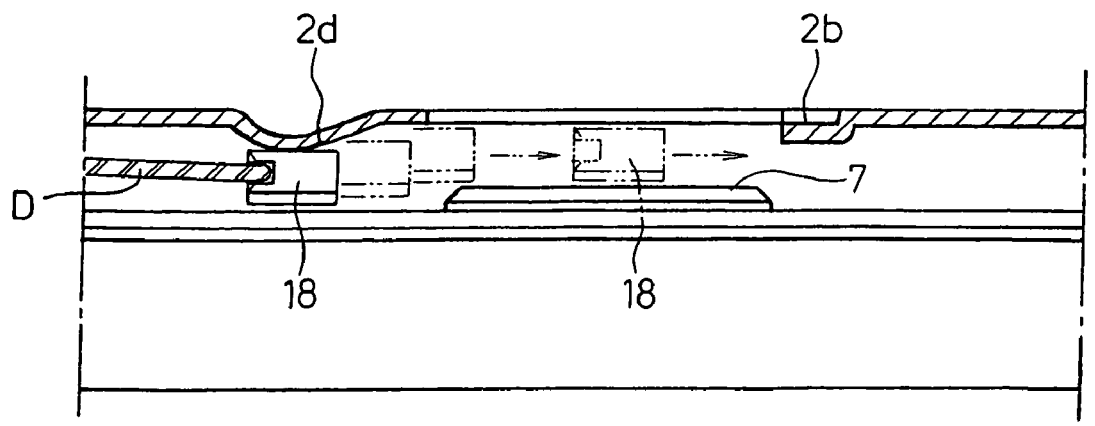

A concave portion 17a of the descending gradient that faces the tip of the disc supporting arm 17 is formed in the disc supporting arm 17. The holder 18 at the tip of the disc supporting arm 17 may be in the up and down motion by the concave portion 17a. That is, according to the disc device of a common structure, as illustrated in FIG. 7(A), the front end of the disc inserted by an operator is not necessarily horizontal but may be inclined upward or downward as illustrated by imaginary lines of FIG. 7(A). Thus, according to the present invention, as mentioned above, the first inclined surface 2c is formed on the top plate and, as illustrated in FIG. 7(B), the disc D contacts the first inclined surface 2c so as not to be inclined upward, such that the disc D is correctly guided to the end holding portion 18a of the holder 18.

Since it is not possible to prevent the tip of the disc D from being inclined downward only by such a structure, the second inclined surface 2d is formed on the top plate and, as illustrated in FIG. 7(C), the holder 18 is forcibly descended from the normal position by the operation of the inclined surface 2d. Thus, even when the front end of the disc D is inclined downward, the end of the disc D is accommodated in the end holding portion 18a of the holder 18 such that the disc D is firmly grabbed.

Figure 8:
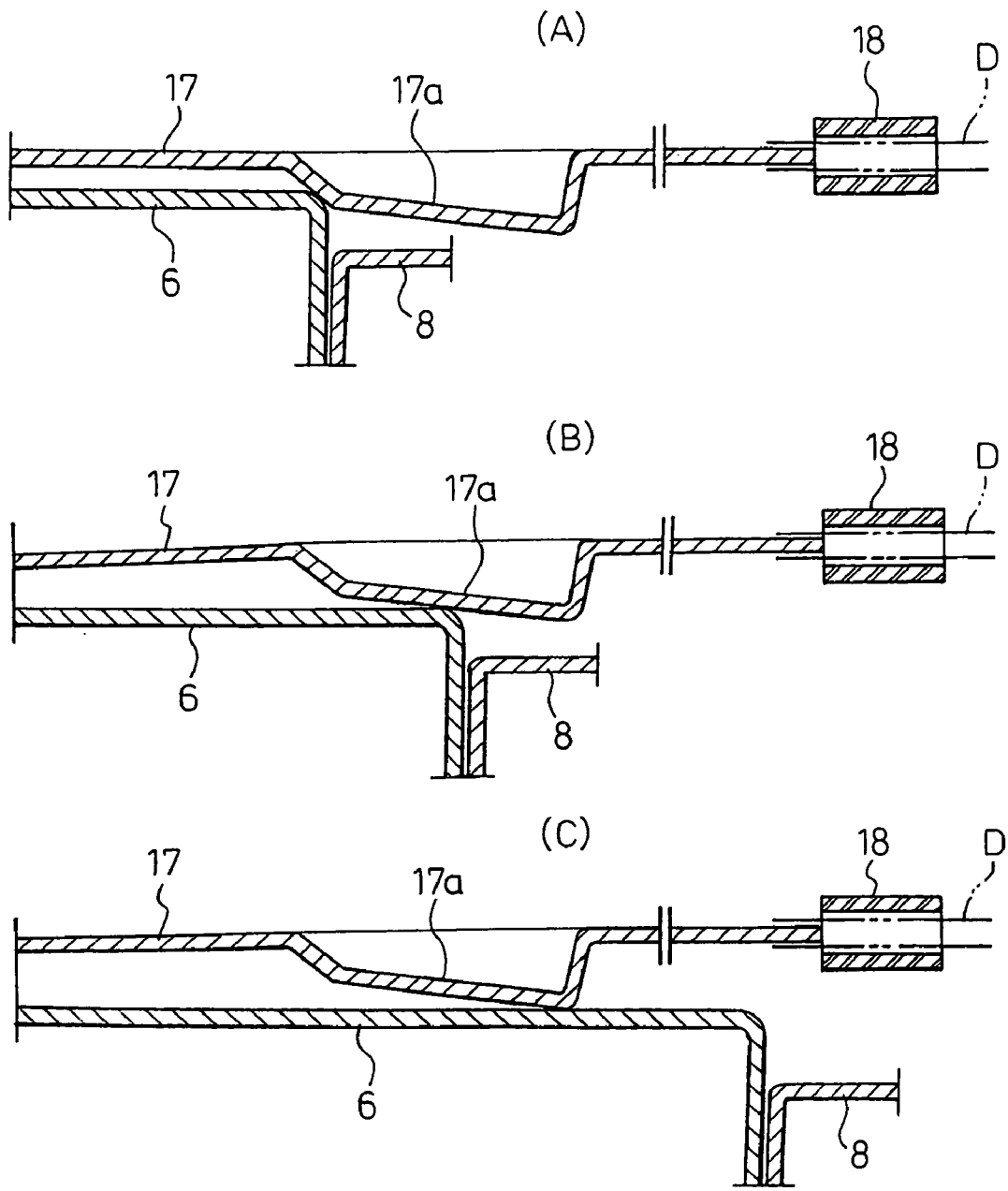
FIG. 8 is a view illustrating the operation of the disc support arm.

According to the above-mentioned structure, when the disc supporting arm 17 is pivoted in a state where the holder 18 is made descend, as illustrated in FIG. 7(C), the holder 18 abuts on the clamp head 7. Thus, according to the present invention, the holder 18 gradually ascends in accordance with the pivot of the disc supporting arm 17 as illustrated in the imaginary line of FIG. 7(C) so as not to abut on the clamp head 7. Such an operation is made by the function of the concave portion 17a of the disc supporting arm 17 and will be described with reference to the view illustrating the enlargement of the main portion of FIG. 8.

First, in the position where the disc supporting arm 17 proceeds most, as illustrated in FIGS. 2 and 3, the concave portion 17a is in the position illustrated in FIG. 8(A). That is, in such a state, the holder 18 is pressed downward by the second inclined surface 2d as illustrated in FIG. 7(C). In such a state, when the disc supporting arm 17 starts to pivot, as illustrated in FIG. 8(B), the concave portion 17a is mounted on the base panel 6, such that the disc supporting arm 17 gradually ascends and the holder 18 is in the normal position in FIG. 8(C) where the concave portion 17a is completely mounted. Thus, the holder 18 does not abut on the clamp head 7 and can repeatedly pivot as illustrated by the imaginary lines of FIG. 2.

Figure 4:
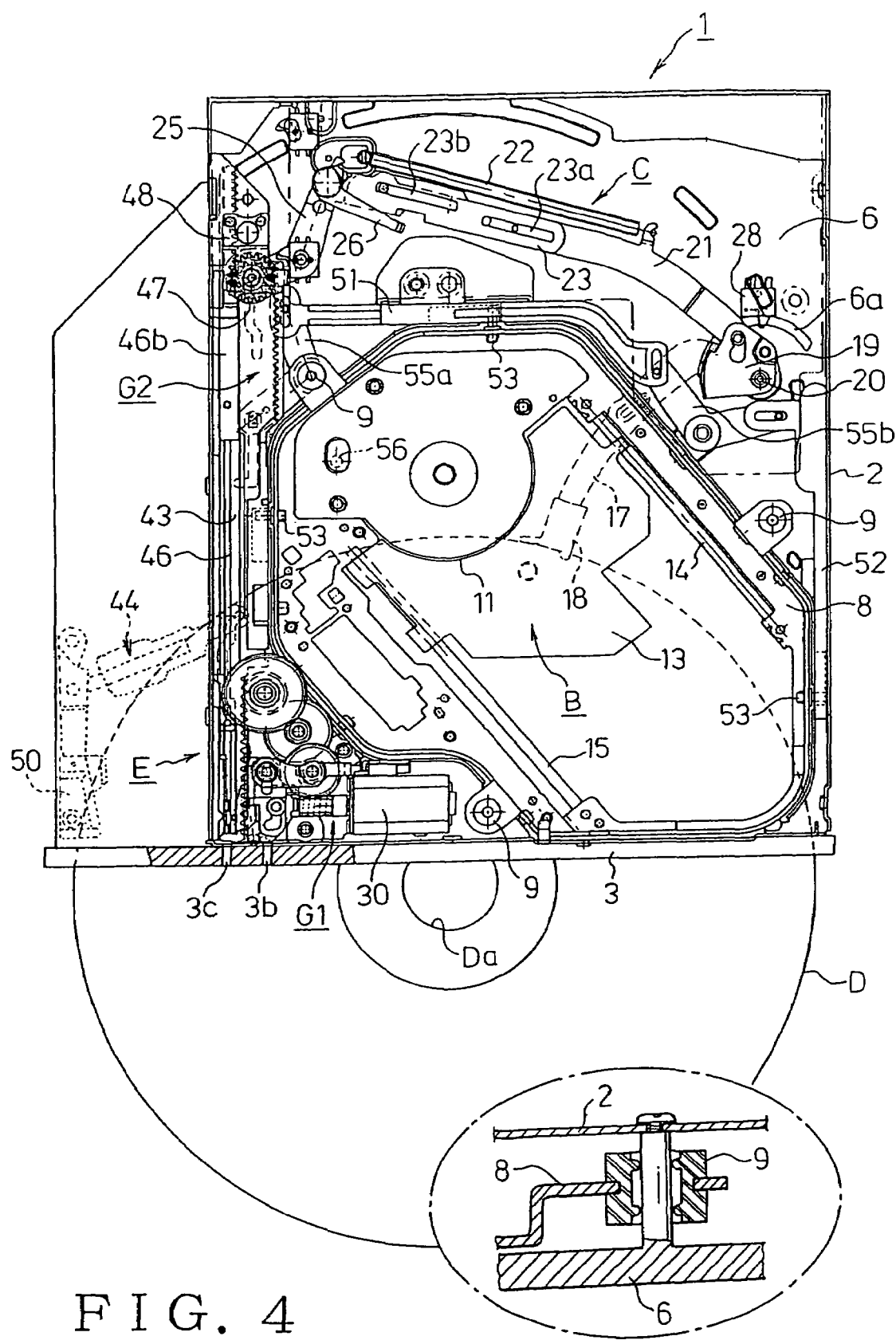
FIG. 4 is a view illustrating the internal structure of the bottom surface of the disc device of FIG. 1.

Next, a driving mechanism C that pivots the disc supporting arm 17 will now be described. The end that is the pivot supporting point of the disc supporting arm 17 is integrated with a supporting plate 19 as illustrated in FIG. 4 on the back of the base panel 6 such that the supporting plate 19 is pivoted by a pivot pin 20. Thus, the disc supporting arm 17 on the base panel 6 pivots in the range of a slit 6a in accordance with the pivot of the supporting plate 19.

Figure 9:
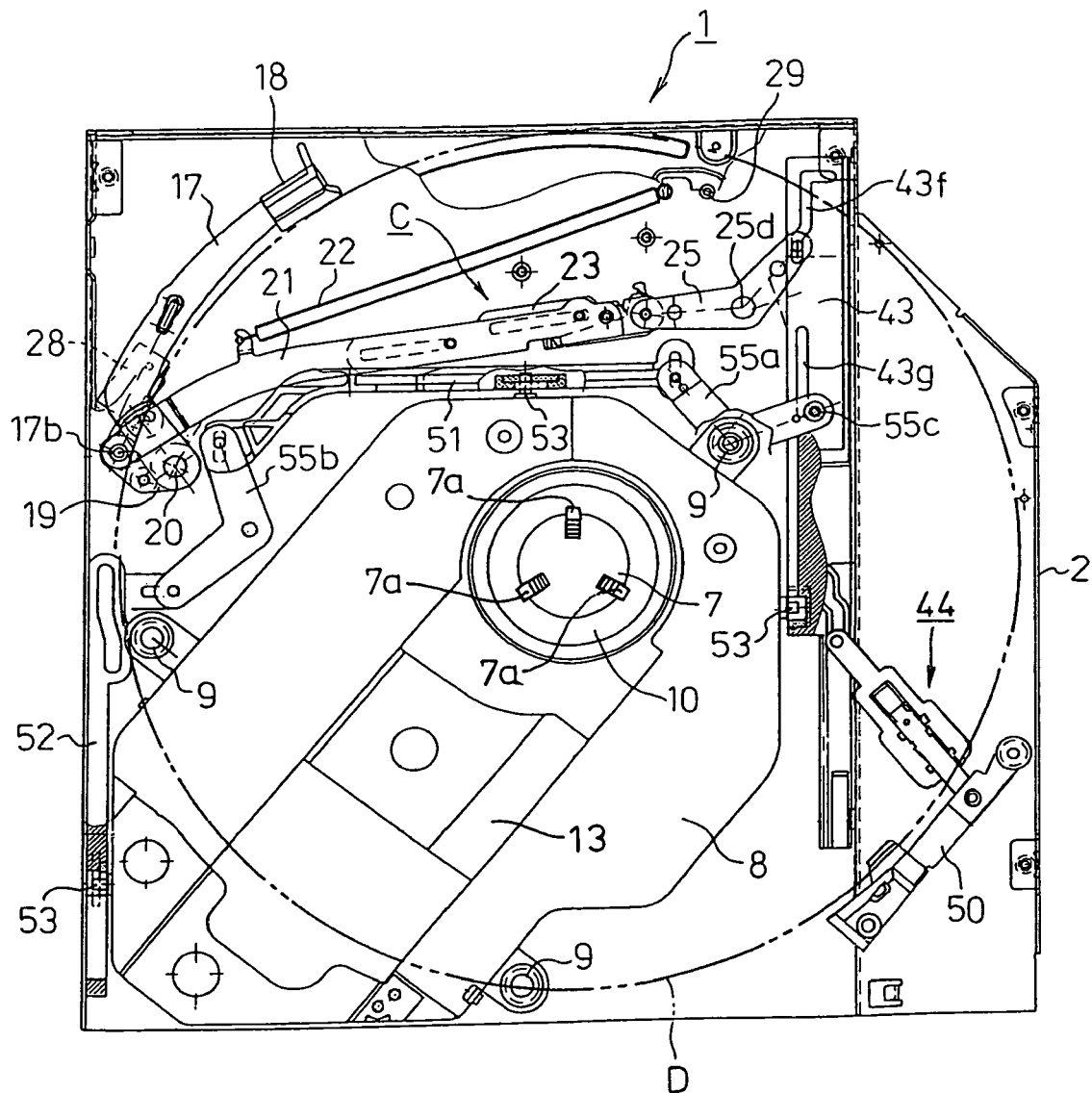
FIG. 9 is a plan view illustrating the components inside of the disc device of FIG. 1.
Figure 10:
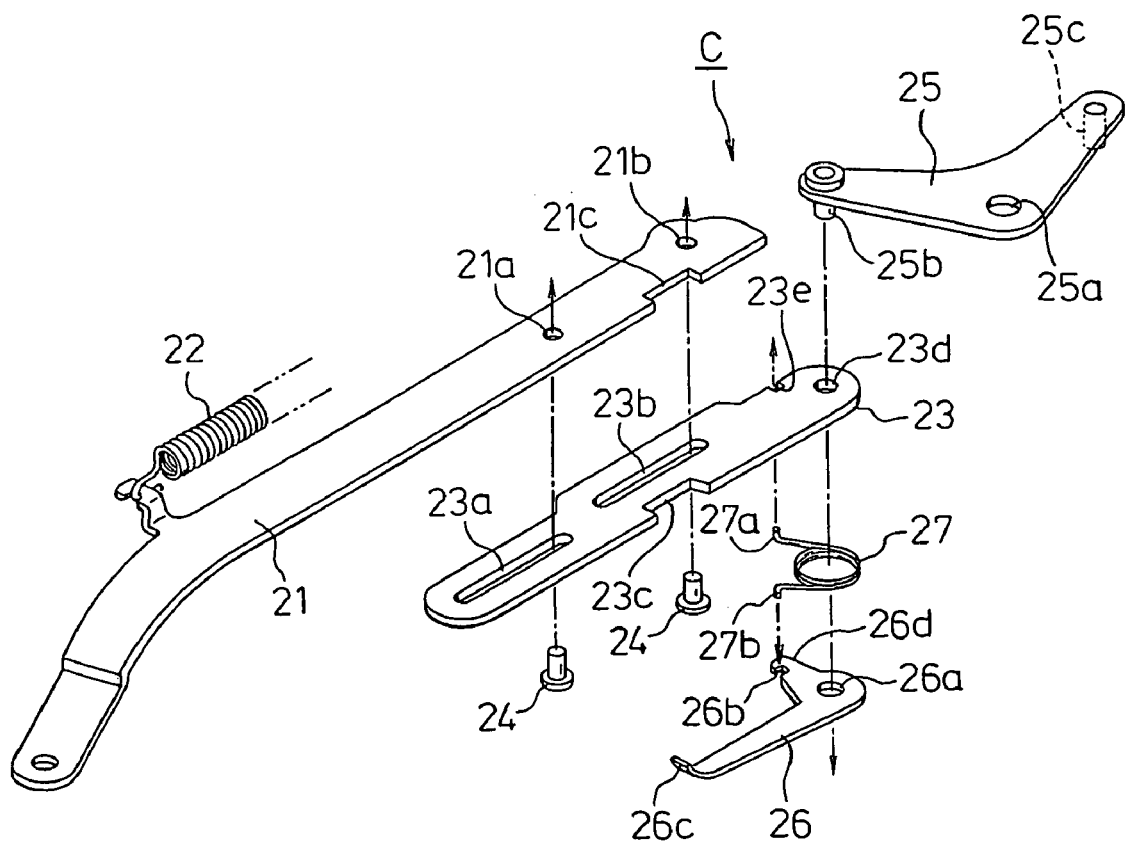
FIG. 10 is an exploded perspective view illustrating the structure of a driving mechanism C.

FIG. 9 illustrates a plane state in which the driving mechanism C of the disc supporting arm 17 is constructed with the base panel 6 removed. A first link arm 21 that directly drives the disc supporting arm 17 is connected by a pivot pin 17b of the supporting plate 19 and is always forced by an extension coil spring 22. On the other hand, as illustrated in FIG. 10, slits 23a and 23b are formed in a second link arm 23. Rivets 24 are inserted through the slits 23a and 23b. The tips of the rivets 24 are fixed into through-holes 21a and 21b of the first link arm 21. The first link arm 21 and the second link arm 23 are extendably and retractably integrated with each other in the range of the slits 23a and 23b. Cut portions 21c and 23c on which the locking device operates are formed in the first link arm 21 and the second link arm 23.

The reference numeral 25 denotes a lever arm for transmitting driving force to the second link arm 23. A through-hole 25a that is a support point is supported by a pivot pin 25d, such that the lever arm can pivot. A pivot pin 25b is fixed to the operation end of the lever arm 25 and the pivot pin 25b is inserted through the through-hole 23d of the second link arm 23 and a through-hole 26a of a locking lever 26. A torsion coil spring 27 is arranged between the second link arm 23 and the locking lever 26. One end 27a of the torsion coil spring 27 is locked by a concave portion 23e of the second link arm 23 and the other end 27b of the torsion coil spring 27 is locked by a concave portion 26b of the locking lever 26. Thus, a locking end 26c of the locking lever 26 is forced in a direction where the locking lever 26 is locked by the cut portion 21c of the first link arm 21 and the cut portion 23c of the second link arm 23. A limit switch 28 that operates in the rear end of the first link arm 21 when the first link arm 21 reach a predetermined position, and a starting pin 29 for pressing a rear end 26d of the locking lever 26 when the second link arm 23 reaches a predetermined position are arranged on the rear surface of the base panel 6.

Figure 11:
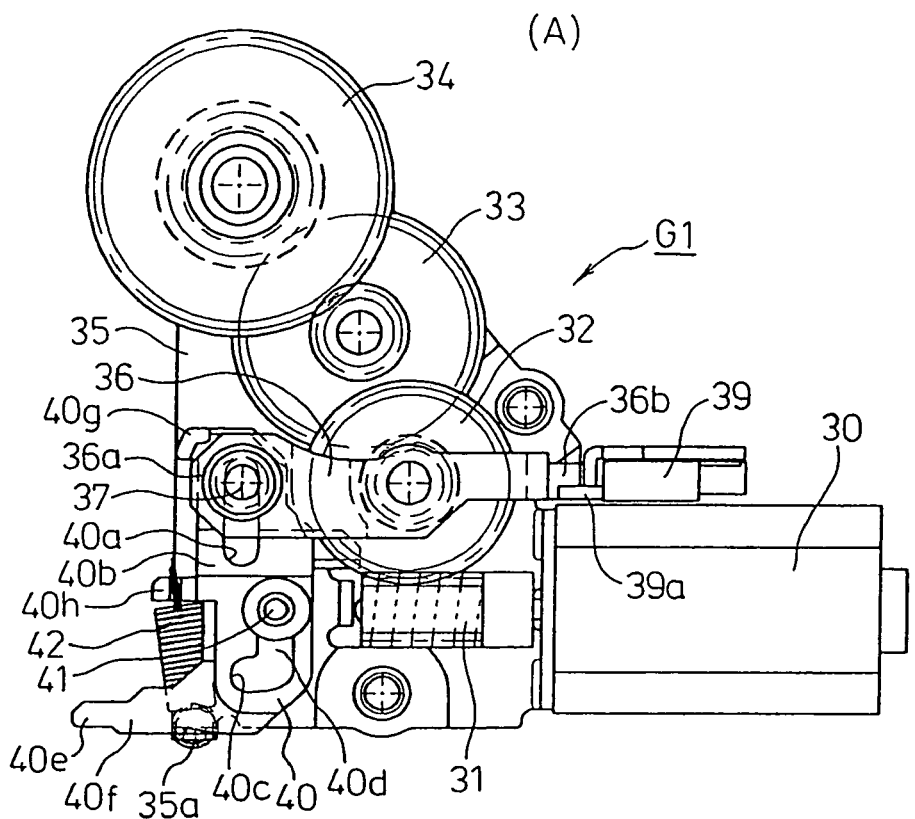
FIG. 11 is a view illustrating a loading gear unit.
Figure 11:
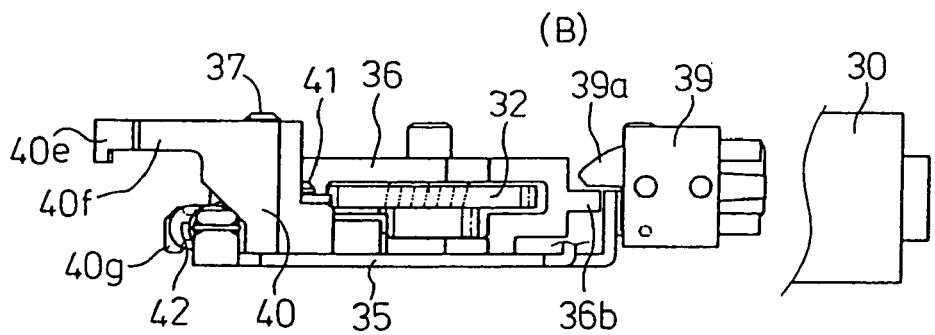
Figure 11:
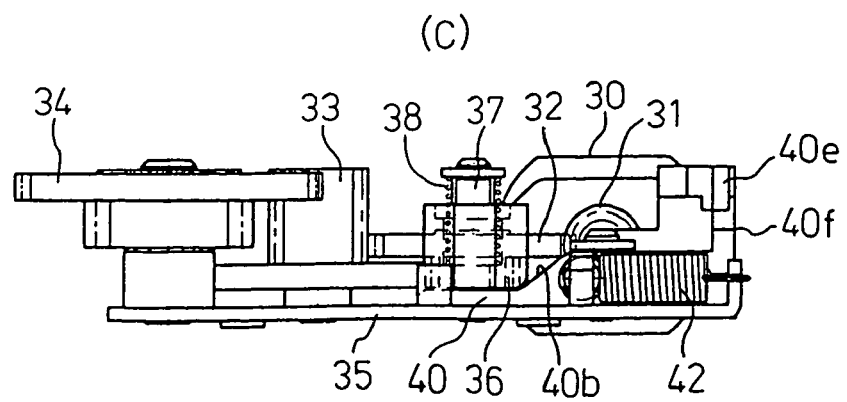
Figure 12:
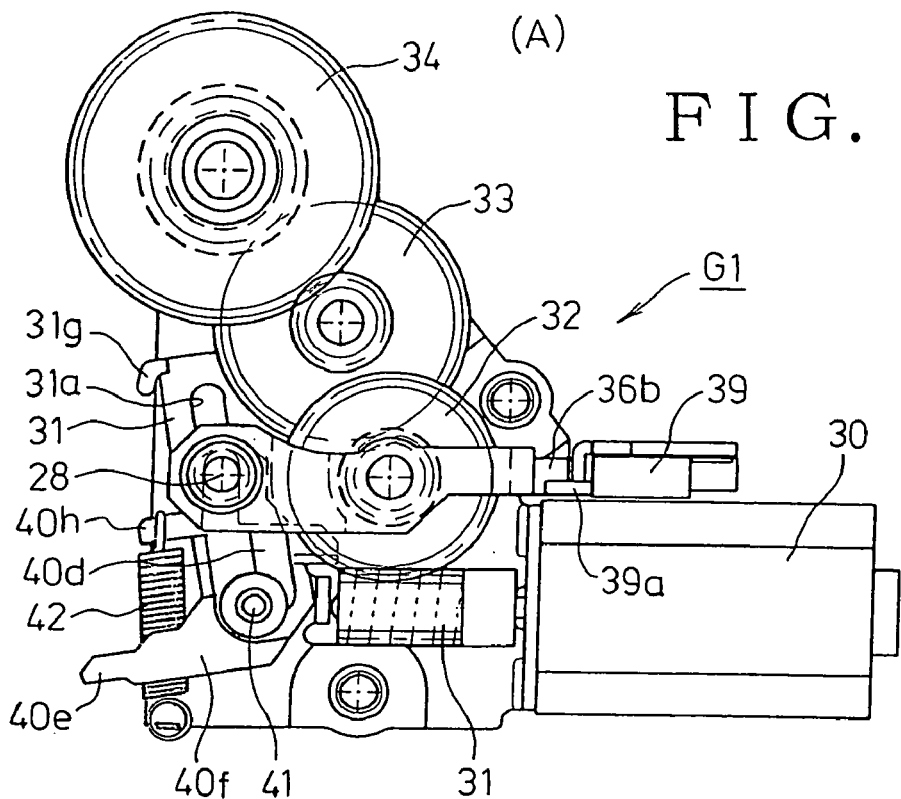
FIG. 12 is a view illustrating the operation of the loading gear unit.
Figure 12:
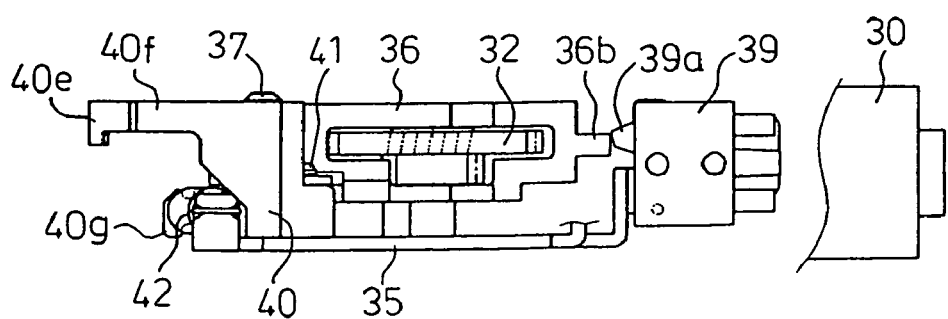
Figure 12:
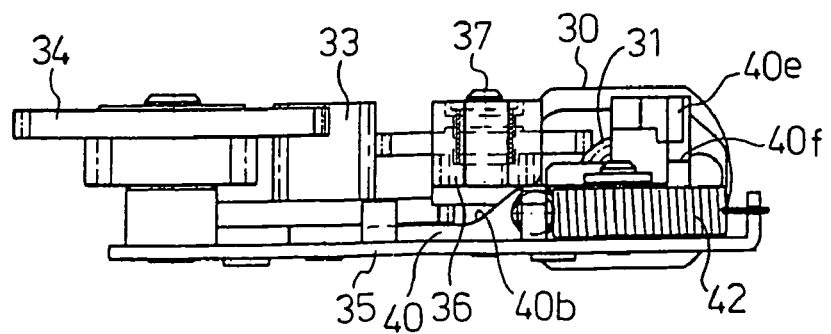

Next, the structures of a slide member and a carrying mechanism E that is power transmission mechanism to the driving mechanism C of the disc supporting arm 17 will now be described. First, the carrying mechanism E comprises a loading gear unit G1 and a rack gear unit G2. FIGS. 11 and 12 are views illustrating the structure and the operation of the loading gear unit G1. In FIGS. 11 and 12, the reference numeral 30 denotes a loading motor that is a power source. A worm gear 31 is fixed to the output shaft of the loading motor 30 so as to coaxially rotate. The torque of the worm gear 31 is sequentially transmitted to double gears 32, 33, and 34 axially supported to a gear base 35, such that the rotational speed is reduced from a small diameter gear to a large diameter gear.

According to the above gearing structure, a double gear 32 includes a release mechanism that releases the gearing state with the worm gear 31. The end 36a of a holder 36 can vertically slide while supporting the double gear 32. A pivot pin 37 is inserted into and passes through the end 36a of a holder 36, and the end 36a of the holder 36 is forced downward by a compression coil spring 38 to be axially supported, such that, in a normal state, as illustrated in FIG. 11(C), the worm gear 31 and the double gear 32 are normally geared with each other. A dog head 36b is formed on loading motor 30 side end of the holder 36, such that a knob 39a of a limit switch 39 fixed to the gear base 35 can be operated.

A slide member 40 coaxially supported by a pivot pin 37 is formed on the bottom surface of the end 36a of the holder 36. An elongated groove 40a is formed in the portion of the slide member 40, which is axially supported by the pivot pin 37, such that the slide member 40 can slide in a direction orthogonal to the end 36a of the holder 36. In the slide member 40, an inclined surface 40b is formed between the front end and the rear end, such that, when the slide member 40 proceeds, the inclined surface 40b pushes the end 36a of the holder 36 from the bottom surface to make the entire holder 36 ascend.

An elongated groove 40d having a locking end 40c axially supported by a pivot pin 41 is formed in the rear end of the slide member 40. An operating pin 40f having a sealing protrusion 40e is formed in the rear end. On the other hand, a reset piece 40g that moves in accordance with the movement of the rack gear unit G2 is formed in the front end of the slide member 40.

As mentioned above, in the integrated slide member 40, an extension coil spring 42 for providing a toggle operation between a hook piece 40h and a hook piece 35a of the gear base 35 is tensely formed to form an inclination angle, such that the slide member 40 is forced to rotate in a counter-clockwise direction while receding.

As mentioned above, since the slide member 40 is constructed, in the normal state illustrated in FIG. 11, the slide member 40 uses the pivot pin 37 as a supporting point. In such a state, when the locking end 40c of the elongated groove 40d reaches the position of a pivot pin 41 by pressing the slide member 40 from the rear end to proceed, the slide member 40 rotates using the pivot pin 37 as the support pin by the tension of the extension coil spring 42, such that, as illustrated in FIG. 12, the pivot pin 41 is locked by the locking end 40c and that the locking is maintained.

Figure 13:
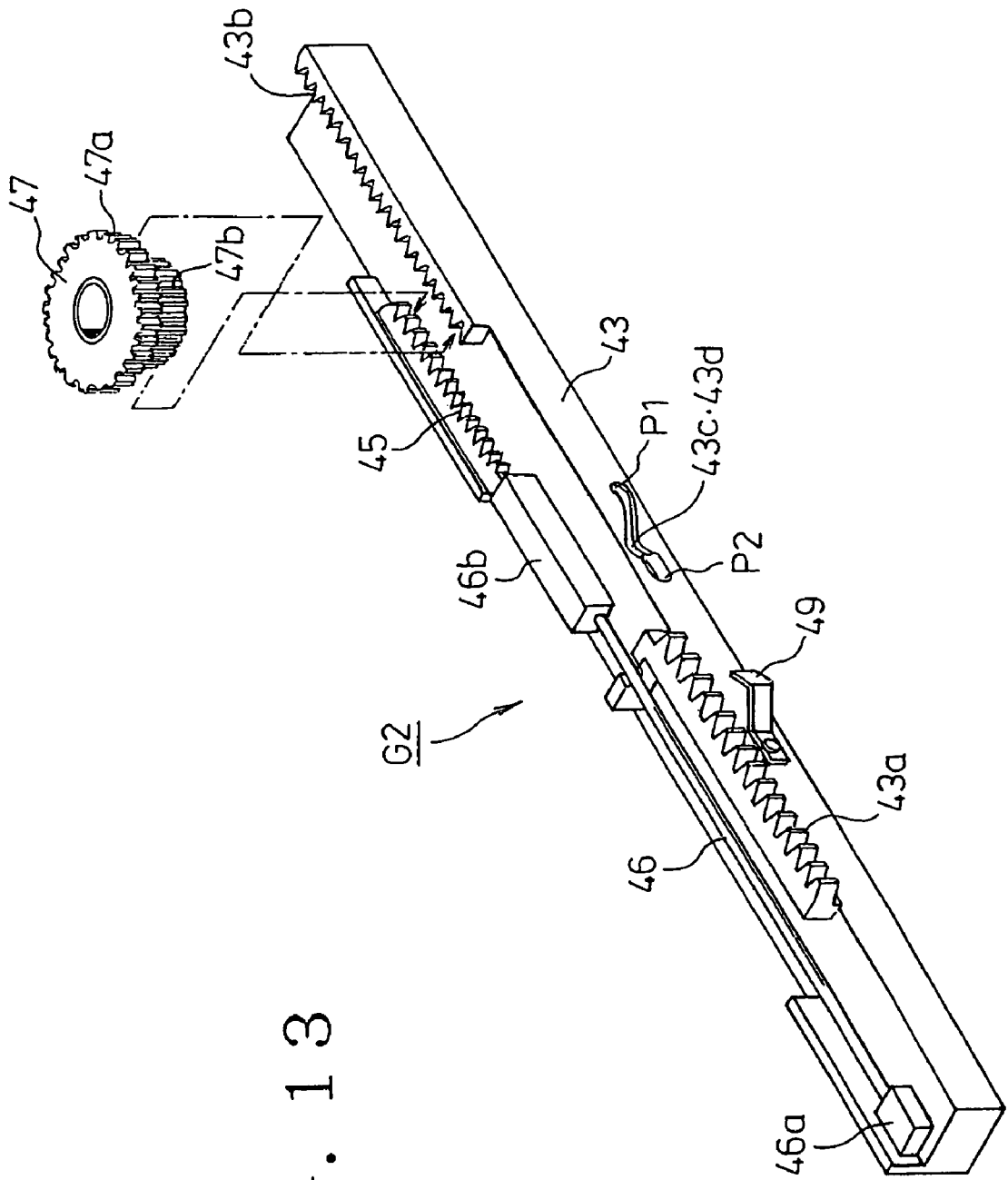
FIG. 13 is a perspective view illustrating the structure of a rack gear unit.

Next, as illustrated in FIG. 13, in the rack gear unit G2, gear columns 43a and 43b are integrated with a rack main body 43. The gear column 43a is geared with the small diameter gear of the double gear 34 of the loading gear unit G1. Thus, the rack main body 43 proceeds or retracts in the chassis case 2 by driving the loading motor 30. As mentioned above, since the rack main body 43 proceeds or retracts, the driving mechanism C connected to the tip of the rack main body 43 is driven, such that the disc supporting arm 17 pivots and that, as illustrated in FIG. 2, an introducing arm 50 is pivoted by a lever arm 44 connected to the rack main body 43 on the base panel 6.

A gear 45 that proceeds and retracts at the tip of the rack main body 43 is arranged on the rack main body 43 having the above-mentioned structure so as to move. In order to push the gear 45 to go ahead, a pressing pin 46 including blocks 46a and 46b in front of and behind the pressing pin 46 is arranged on the rack main body 43. The gear column 43b and the gear 45 are geared with and connected to a double gear 47 rotatably loaded in a gear frame 48. In such a case, a large diameter gear 47a of the double gear 47 is engaged with the rear end of the gear column 43b and a small diameter gear 47b is geared with the tip of the gear 45 integrated with the block 46b.

Thus, when the gear 45 is pushed by the external force through the pressing pin 46, the double gear 47 rotates in the prescribed position. Thus, the torque of the large diameter gear 47a is transmitted to the gear column 43b and the rack main body 43 moves. The reference numeral 49 denotes an operating piece that presses the reset piece 40g formed in the front end of the slide member 40 of the above-mentioned loading gear unit G1. In the case where the loading gear unit G1 is in the state illustrated in FIG. 12, when the operating piece 49 presses the reset piece 40g of the slide member 40, since the locking of the pivot pin 41 to the locking end 40a is released, the state returns to the one as illustrated in FIG. 11.

Figure 5:
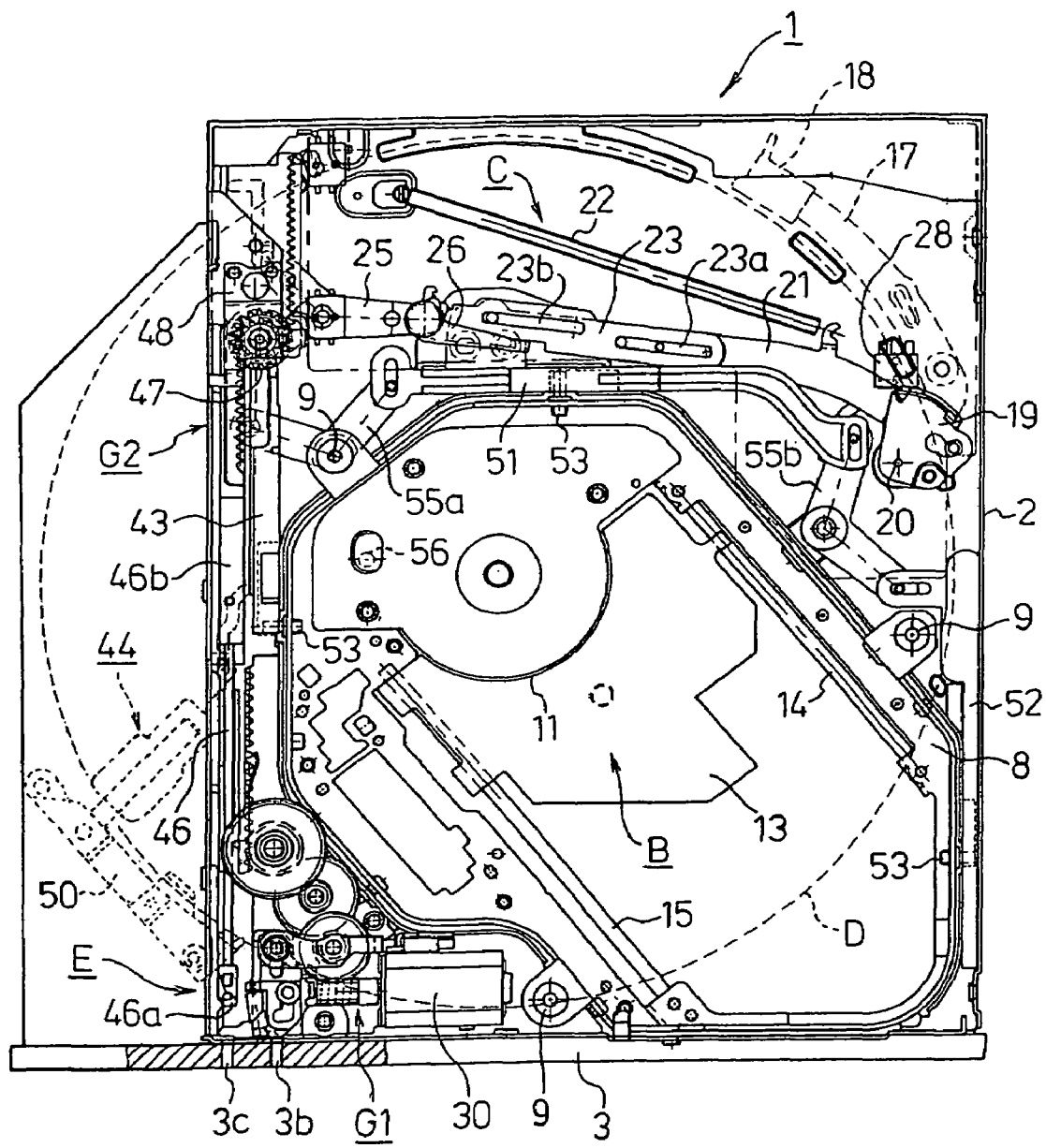
FIG. 5 is a view illustrating the operation of the disc device of FIG. 1.

Next, the structure and the operation of the ascending and descending mechanism of the frame member 8 will now be described. The ascending and descending mechanism comprises the rack main body 43, slide members 51 and 52 that proceed and retract in synchronization with the rack main body 43, and a driven pin 53 guided to cam grooves formed in the slide members 51 and 52. The slide member 51 is connected to the rack main body 43 by a link member 55a. Also, the slide member 51 is connected to the slide member 52 by a link member 55b. Thus, the rack main body 43 and the slide members 51 and 52 proceed and retract in synchronization with each other. FIG. 4 illustrates a state in which the rack main body 43 proceeds most. FIG. 5 illustrates a state in which the rack main body 43 retracts most.

The opened end of the driven pin 53 fixed to the frame member 8 is locked to the rack main body 43 and to the cam grooves formed in the slide members 51 and 52. Since the locking of the driven pin 53 to the respective cam grooves is common, the locking of the rack main body 43 to the cam grooves and to the driven pin 53 will now be described.

First, in the embodiments illustrated in FIGS. 14 to 20, an elastic ring 54 having flexibility is mounted in the driven pin 53 fixed to the frame member 8. The cam grooves formed in the rack main body 43 have a double cam structure comprises a cam groove 43c by which the driven pin 53 is guided while contacting the cam groove 43c so as to slide and a cam groove 43d to which the driven pin 53 is locked such that the elastic ring 54 does not contact the driven pin 53 in the process where the driven pin 53 is guided by the cam groove 43c.

In the higher portion P2 of the cam grooves 43c and 43d, in order to support the elastic ring 54, the cam groove 43d is formed to have the diameter almost equal to the diameter of the elastic ring 54. Also, the formation of the cam groove 43c is stopped around the entrance of the higher portion P2, such that the cam groove 43c is opened to the higher portion P2. Thus, in the range where the cam groove 43c is formed, the driven pin 53 is supported by the cam groove 43c and, in the higher portion P2, the driven pin 53 is supported through the elastic ring 54.

Figure 14:
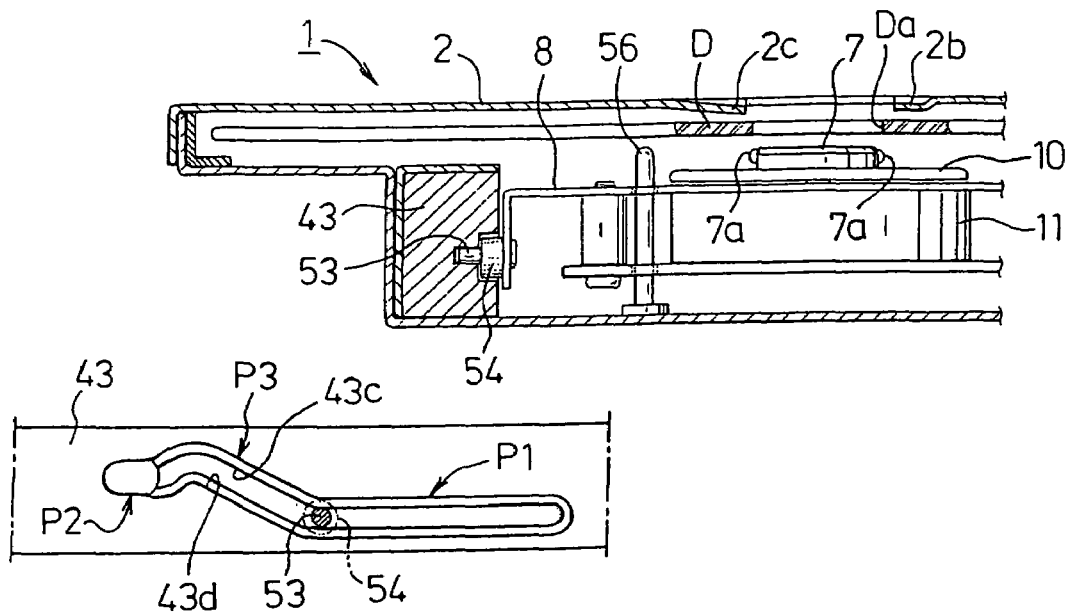
FIG. 14 is a view illustrating a first process of the operation of an ascending and descending mechanism.
Figure 15:
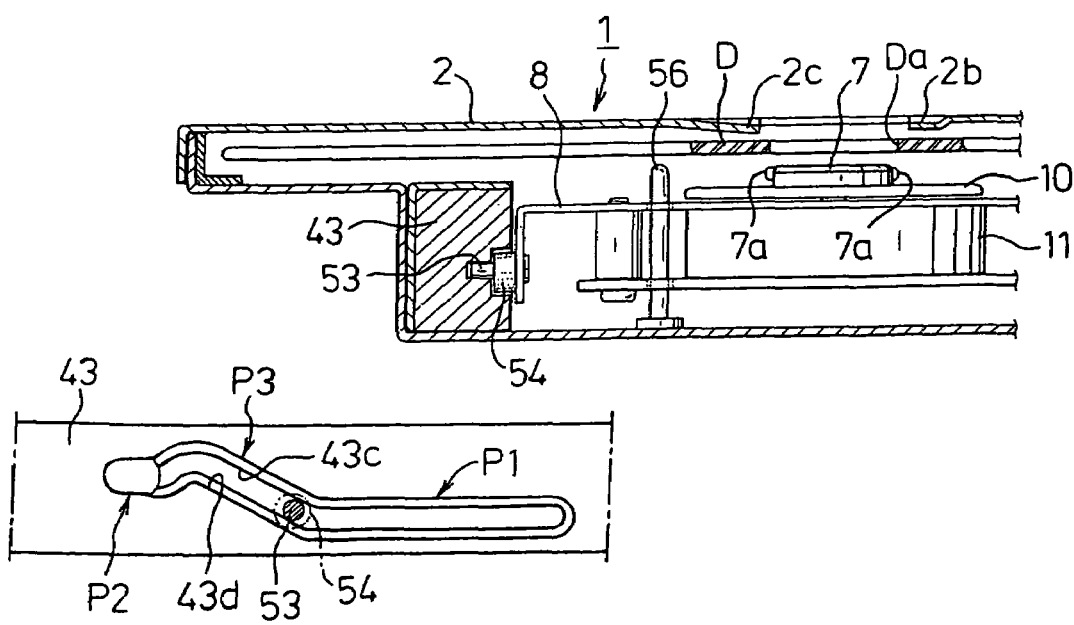
FIG. 15 is a view illustrating a second process of the operation of the ascending and descending mechanism.

Next, the operation of the ascending and descending mechanism of the frame member 8 having the above-mentioned structure will be described with reference to FIGS. 14 to 20. FIG. 14 illustrates an initial state in which the disc D is loaded on the disc device 1, such that the central hole Da of the disc D stops in a position that faces the clamp head 7. In such a state, since the driven pin 53 is in the lower portion P1 of the cam groove 43c, the frame member 8 is made descend lowest and the clamp head 7 is ready to ascend. In such a state, when the rack main body 43 starts to retract, as illustrated in FIG. 15, the driven pin 53 is guided to the inclined surface P3 of the cam groove 43c and gradually ascends. In accordance with the ascending of the driven pin 53, the frame member 8 and the clamp head 7 also start to ascend.

Figure 16:
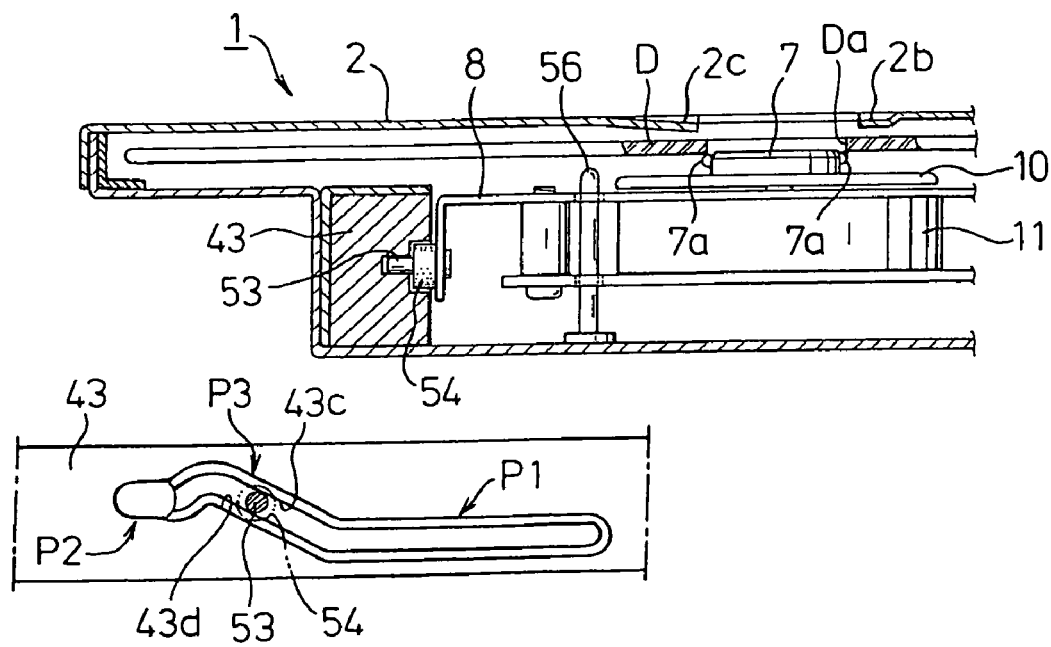
FIG. 16 is a view illustrating a third process of the operation of the ascending and descending mechanism.
Figure 17:
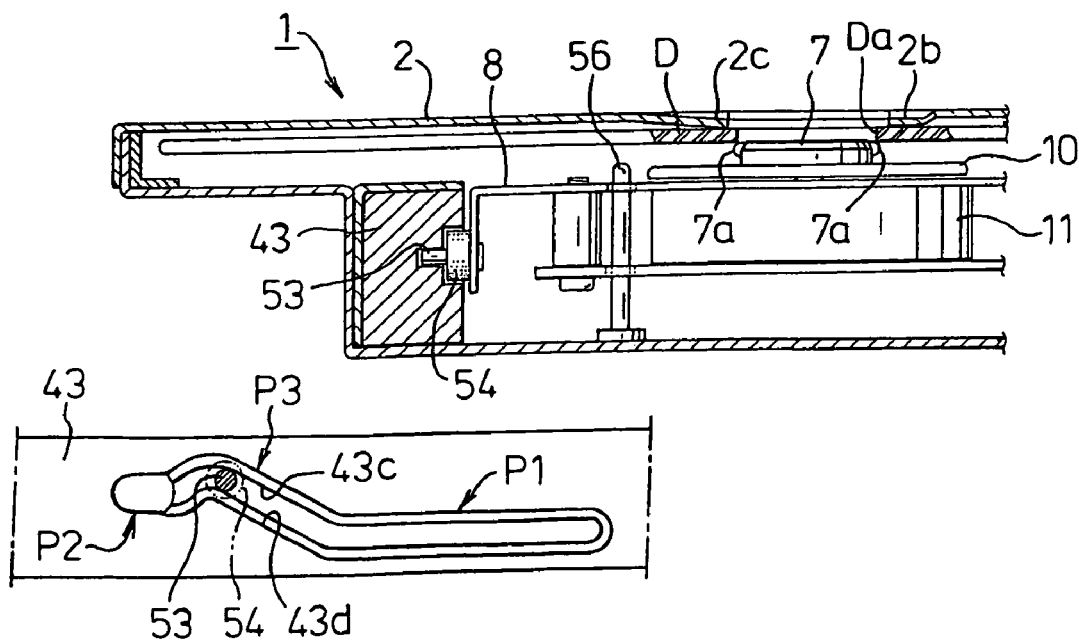
FIG. 17 is a view illustrating a fourth process of the operation of the ascending and descending mechanism.
Figure 18:
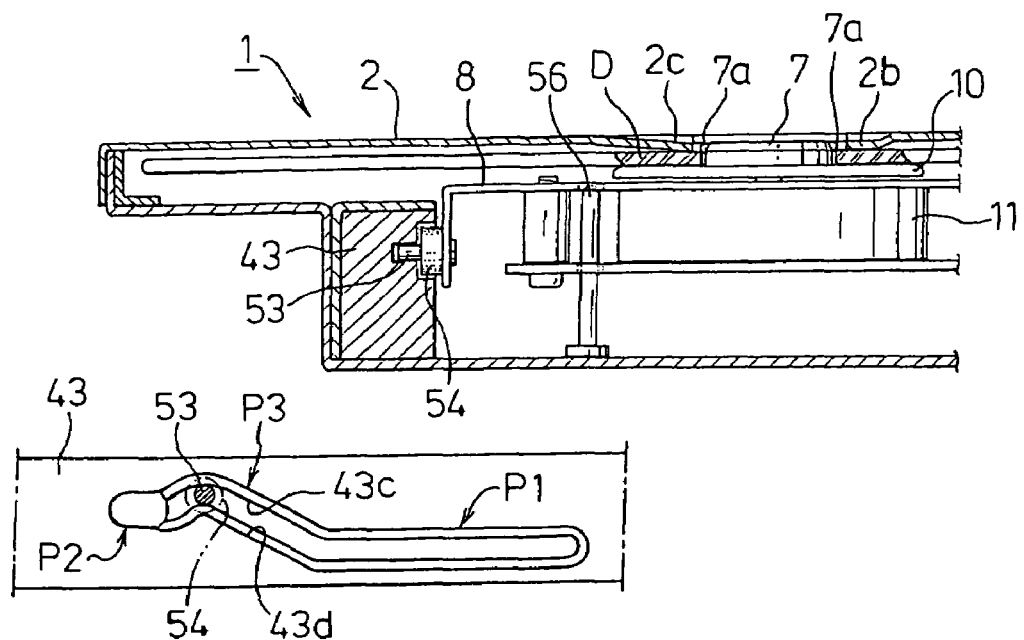
FIG. 18 is a view illustrating a fifth process of the operation of the ascending and descending mechanism.

When the driven pin 53 guided to the cam groove 43c climbs up the inclined portion P3 as illustrated in FIG. 16, the chuck pawl 7a of the clamp head 7 abuts on the end of the opening of the central hole Da of the disc. In this state, as illustrated in FIG. 17, when the clamp head 7 ascends, the chuck pawl 7a pushes the disc D and presses the end of the opening of the central hole Da to the convex portion 2b of the opening 2a of the chassis case 2. When the driven pin 53 is guide to reach the top of the cam groove 43c as illustrated in FIG. 18, the clamp head 7 is inserted into the central hole Da of the disc D and the chuck pawl 7a locks the end of the central hole Da of the disc D to thus fix the disc D on the turntable 10 such that the clamp is completed. The convex portion 2b is formed at about ⅗ of the circumference of the opening 2a and is not formed at the remaining about ⅖ of the circumference. Thus, when the clamp head 7 ascends, the disc D is pressed by the convex portion 2b to be inclined, but it is possible to smoothly perform the clamp operation by the inclination.

Figure 19:
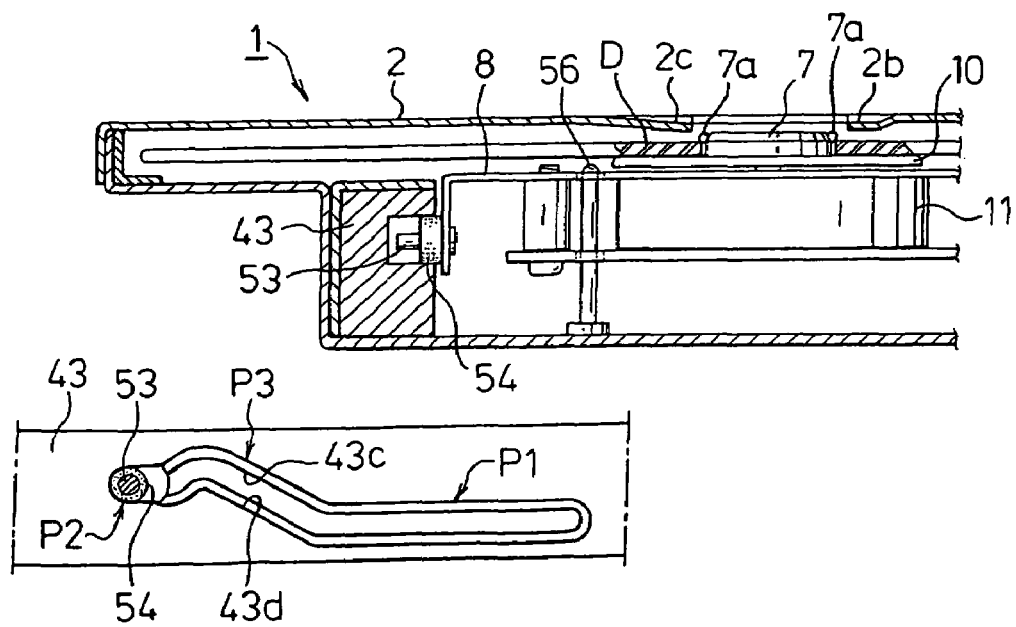
FIG. 19 is a view illustrating a sixth process of the operation of the ascending and descending mechanism.

In the state of FIG. 18, when the rack main body 43 retracts, the frame member 8 slightly descends and, as illustrated in FIG. 19, the elastic ring 54 enters the higher portion P2. Thus, the driven pin 53 is released from the cam groove 43c, such that the driven pin 53 is not supported by the cam groove 43c. At the same time, the driven pin 53 is elastically supported by the elastic ring 54, such that the frame member 8 is buffered.

Figure 20:
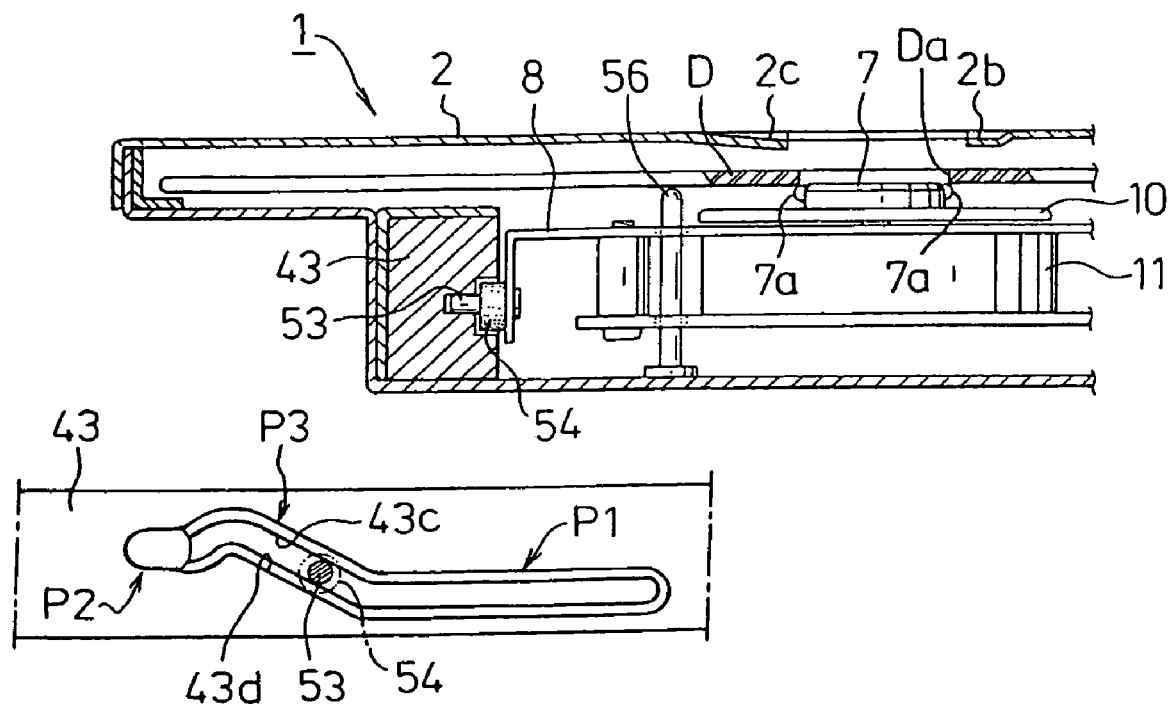
FIG. 20 is a view illustrating a seventh process of the operation of the ascending and descending mechanism.
Figure 21:
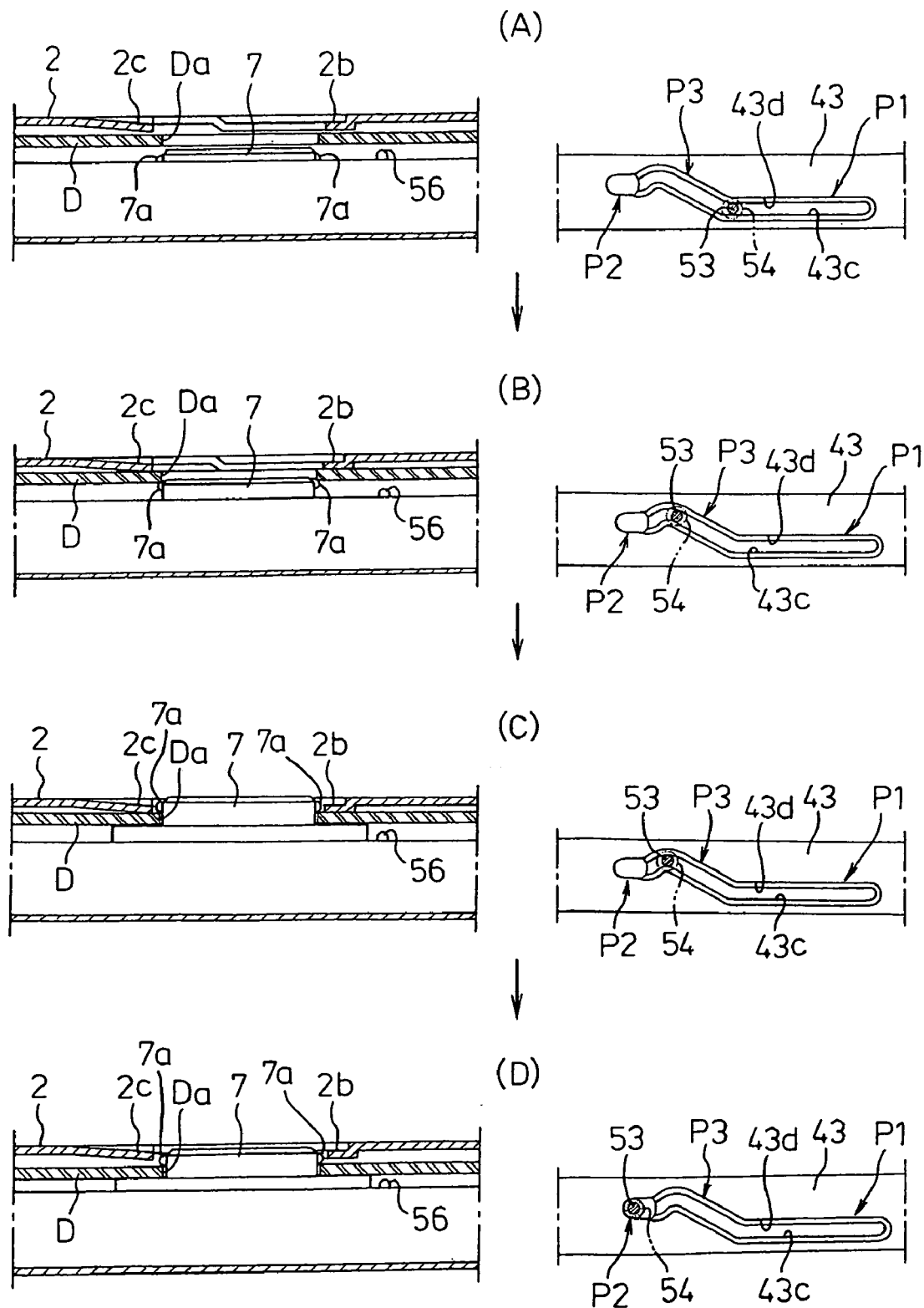
FIG. 21 is a view illustrating an outward route in an ascending and descending operation of a clamp head.
Figure 22:
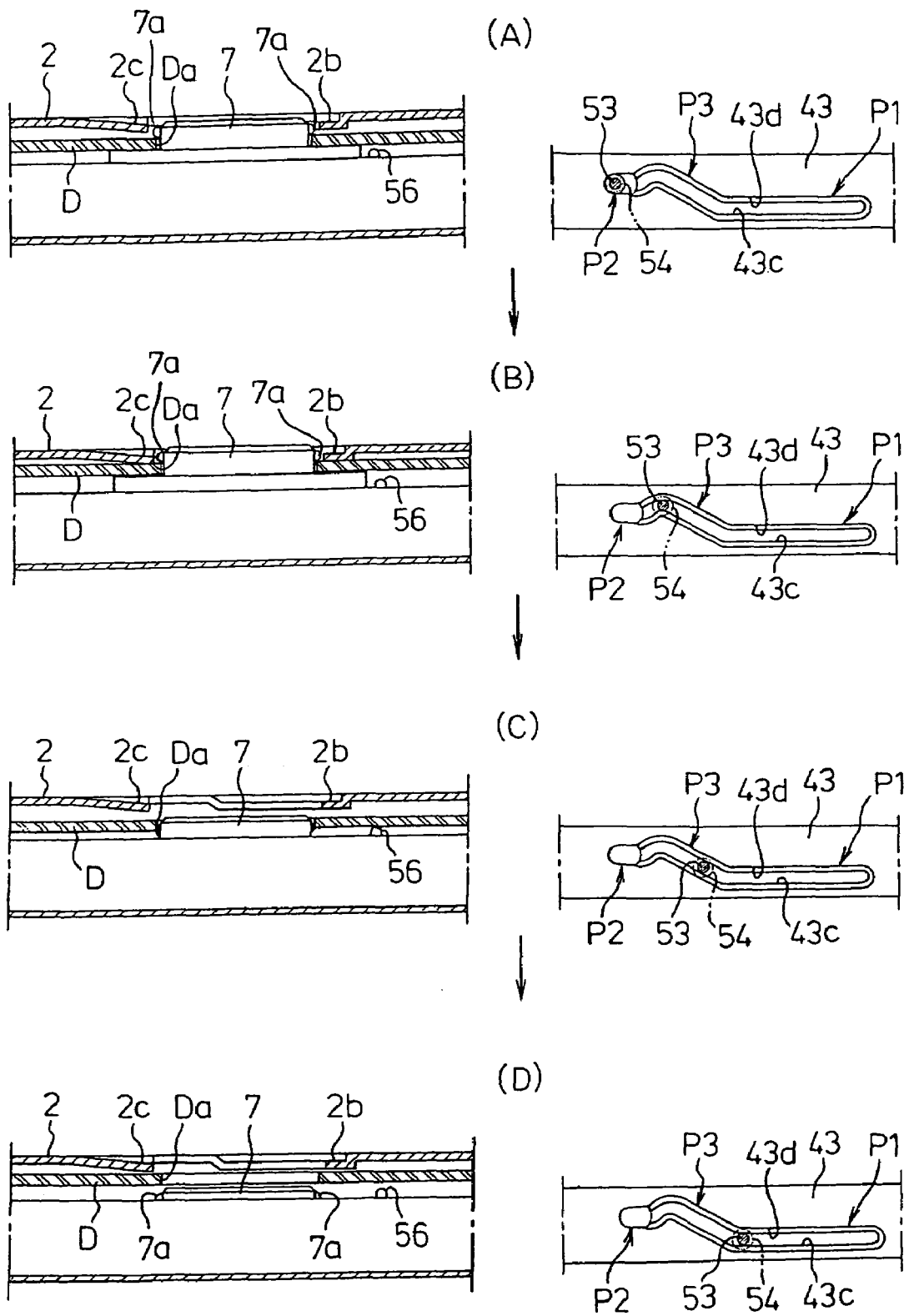
FIG. 22 is a view illustrating a homeward route in the ascending and descending operation of the clamp head.

FIG. 20 is a view illustrating the process of unloading the disc D. The rack main body 43 is made proceed, such that the driven pin 53 reaches the lower portion P1 through the process reverse to the above-mentioned process, during which the disc D is released form the clamp head 7 by a clamp releasing pin 56, such that the disc D can be unloaded to the outside of the device. In order to facilitate the above-mentioned operation, the process of clamping the disc D as illustrated in FIG. 21 and the process of releasing the clamp of the disc D as illustrated in FIG. 22 will be continuously described.

Figure 23:
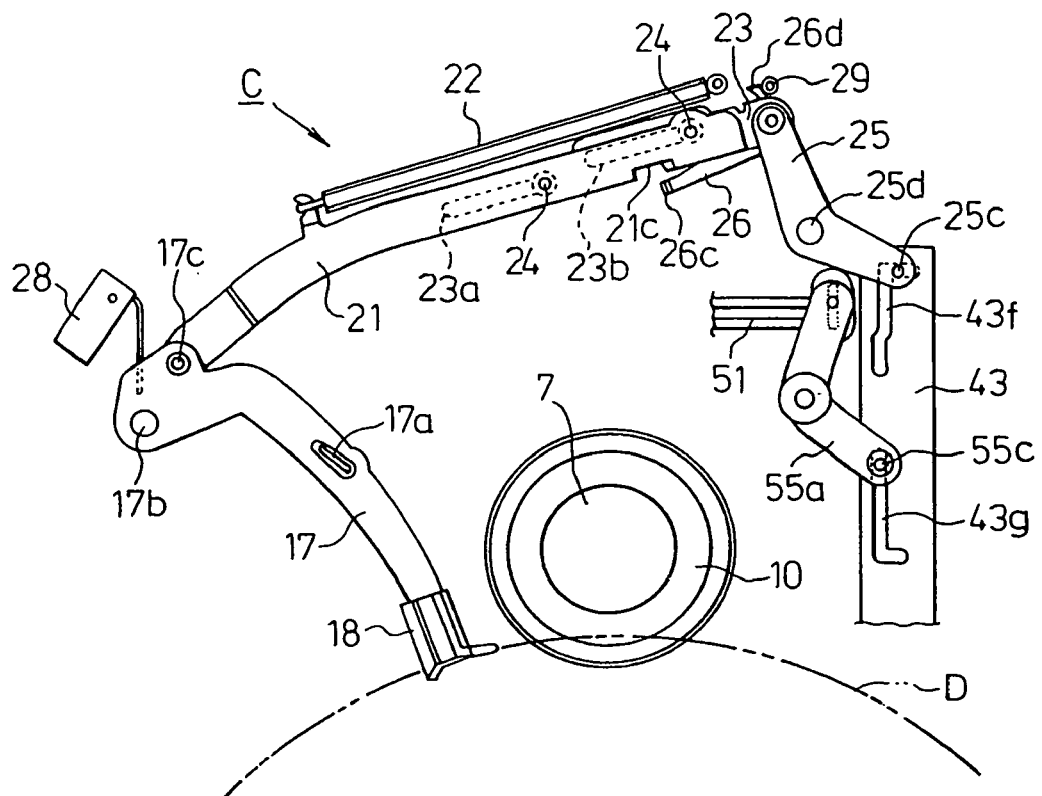
FIG. 23 is a view illustrating a first process of the operation of a disc supporting arm.

Next, the operation of the disc supporting arm 17 will now be described. The driving mechanism C for driving the disc supporting arm 17 is formed by assembling the components illustrated in FIG. 10. The operation will be performed in accordance with the procession and recession of the rack main body 43. That is, in FIG. 23, a driven pin 25c fixed to the end of the lever arm 25 is mounted in a guide groove 43f formed in the rack main body 43, such that the driven pin 25c is guided to the guide groove 43f. FIG. 23 illustrates an initial state in which an operator inserts the disc D from the slot 3a such that the front end is accommodated in the end holding portion 18a of the holder 18 of the tip of the disc supporting arm 17. At this point of time, since the rear end 26d of the lock lever 26 is pressed by the starting pin 29, the locking end 26c is not positioned between the cut portions 21c and 23c of the first and second link arms 21 and 23.

Figure 24:
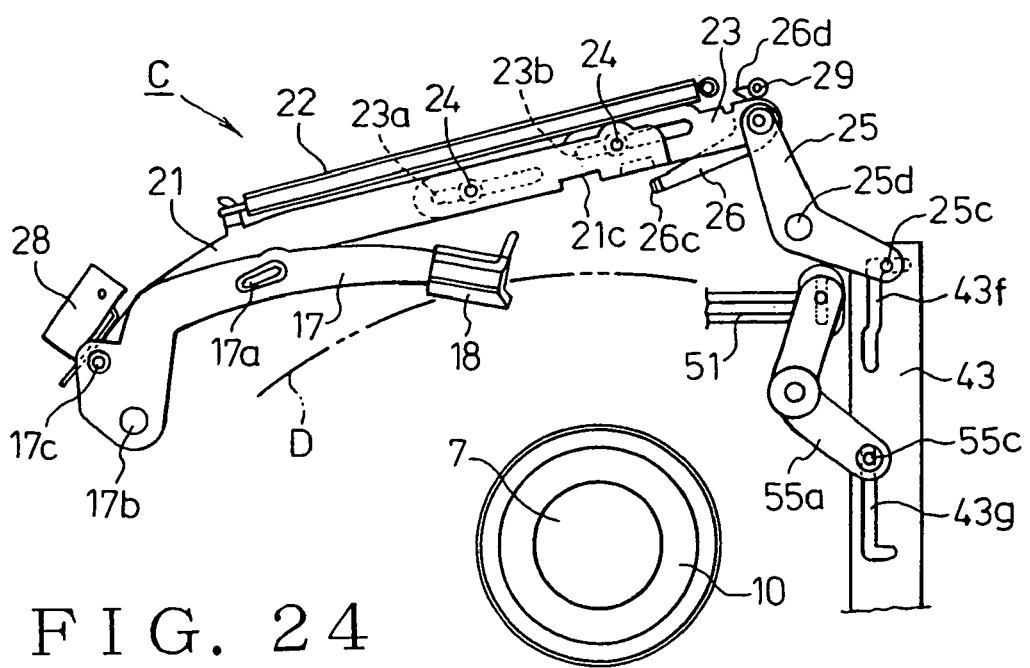
FIG. 24 is a view illustrating a second process of the operation of the disc supporting arm.

FIG. 24 illustrates a state in which the operator pushes the disc D inward such that the disc supporting arm 17 pivots backward and in which the first link arm 21 connected to the end of the disc supporting arm 17 by the pivot pin 17c is pulled, such that the limit switch 28 operates. At this time, since the lever arm 25 is connected to the still rack main body 43, the second link arm 23 connected to the lever arm 25 is maintained in the prescribed position. Thus, the first link arm 21 is unlocked from the second link arm 23. Also, as illustrated in FIG. 24, the first link arm 21 slides on the second link arm 23 to be extended.

Figure 25:
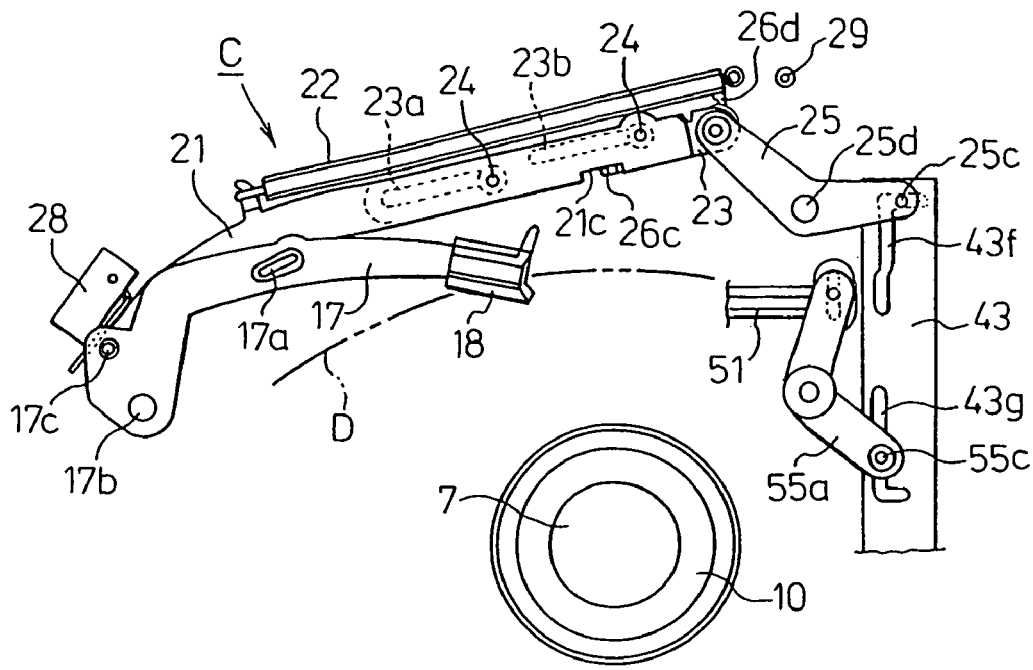
FIG. 25 is a view illustrating a third process of the operation of the disc supporting arm.

FIG. 25 illustrates a state in which the carrying mechanism E starts to drive based on the signal from the limit switch 28 that operates as mentioned above and the rack main body 42 retracts. In such a state, since the lever arm 25 pivoted by the guide groove 43f in accordance with the recession of the rack main body 43 and the second link arm 23 slides and proceeds so as to follow the first link arm 21, the locking end 26c of the locking lever 26 released from the pressing by the starting pin 29 exists between the cut portions 21c and 23c of the first and second link arms 21 and 23, such that the integrated first and second link arms 21 and 23 are locked. That is, when the disc D is loaded, the first and second link arms 21 and 23 are displaced in the extension direction (from the state of FIG. 23 to the state of FIG. 25), such that the first and second link arms 21 and 23 are locked.

Figure 26:
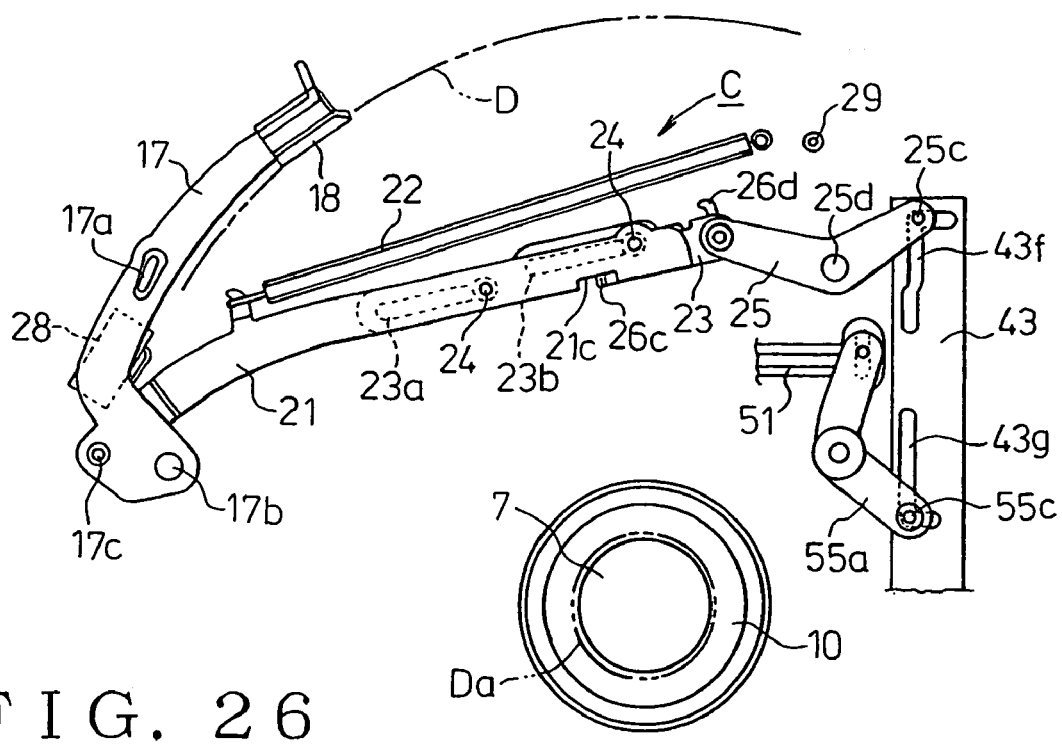
FIG. 26 is a view illustrating a fourth process of the operation of the disc supporting arm.

FIG. 26 illustrates a state in which the rack main body 43 retracts such that the disc supporting arm 17 pivots backward to load the disc D and that the central hole Da of the disc D is positioned on the clamp head 7. Until this point of time, the disc D is maintained by the holder 18 and the introducing arm 50 and the disc supporting arm 17 and the introducing arm 50 pivot in synchronization with each other. Until the point of time, a driven pin 55c of a link 55a only slides on the guide groove 43g of the rack main body 43 and does not receive the operation caused by the recession of the rack main body 43.

Figure 27:
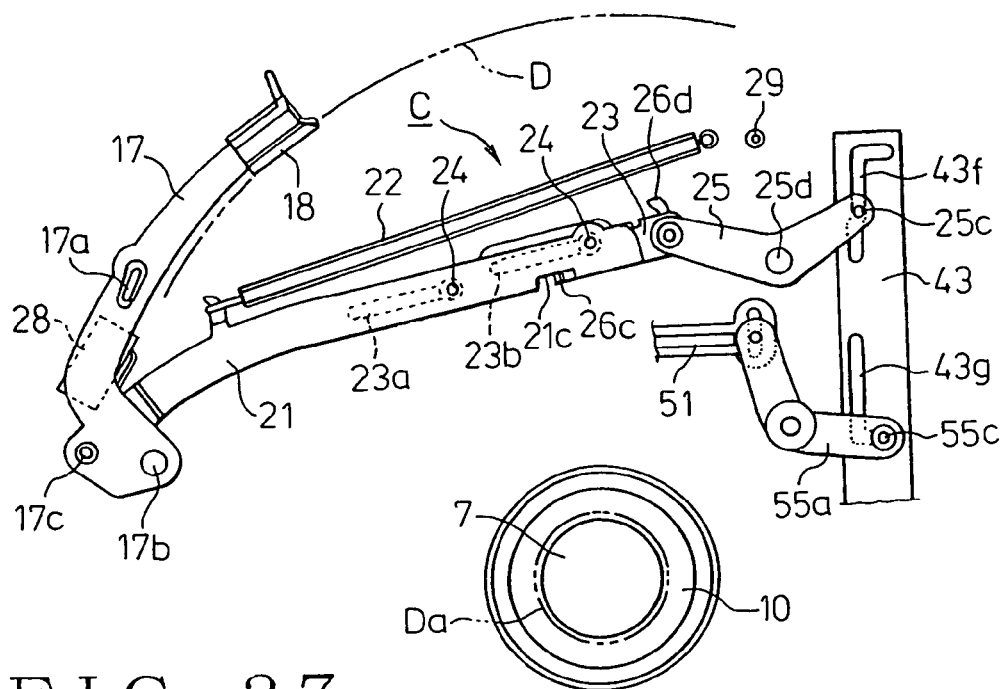
FIG. 27 is a view illustrating a fifth process of the operation of the disc supporting arm.

In the processes from FIG. 26 to FIG. 27, since the driven pin 25c of the lever arm 25 slides only along a longitudinal slot of the guide groove 43f of the rack main body 43, the disc supporting arm 17 is maintained at the prescribed position. Meanwhile, since the driven pin 55c of the link 55a is pushed up from a horizontal groove of the guide groove 43g of the rack main body 43, the slide members 51 and 52 slide together with the rack main body 43 during the processes reaching the state illustrated in FIG. 27 from the state illustrated in FIG. 26, an ascending and descending mechanism of the frame member 8 is operated such that the clamp head 7 clamps the central hole Da of the disc at the point of time illustrated FIG. 27.

Figure 28:
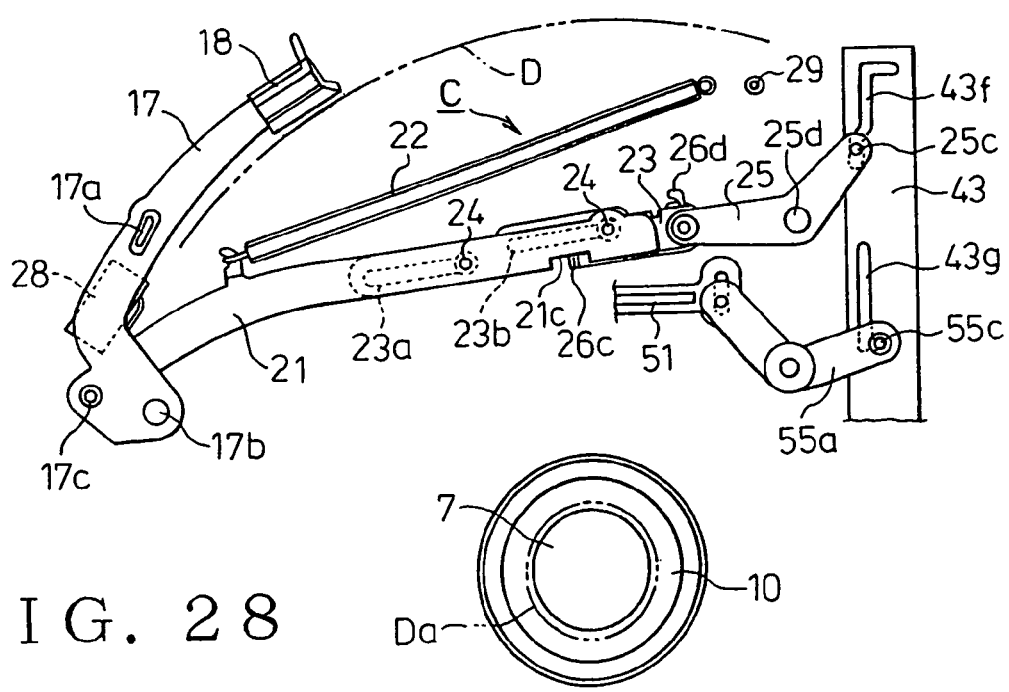
FIG. 28 is a view illustrating a sixth process of the operation of the disc supporting arm.

FIG. 28 illustrates a state in which the rack main body 43 is slightly retracted after the clamp head 7 clamps the central hole Da of the disc D. Accordingly, the lever arm 25 slightly pivots at the end portion of the longitudinal slot of the guide groove 43f and, as illustrated in the same drawing, also the disc supporting arm 17 slightly pivots, such that the holding of the disc D by the holder 18 is released. At this point of time, the introducing arm 50 also slightly pivots to release the disc D. Furthermore, at the ascending and descending mechanism of the frame member 8, the driven pin 53 is slightly lowered in the cam groove 43c to make the disc D rotatable.

Figure 29:
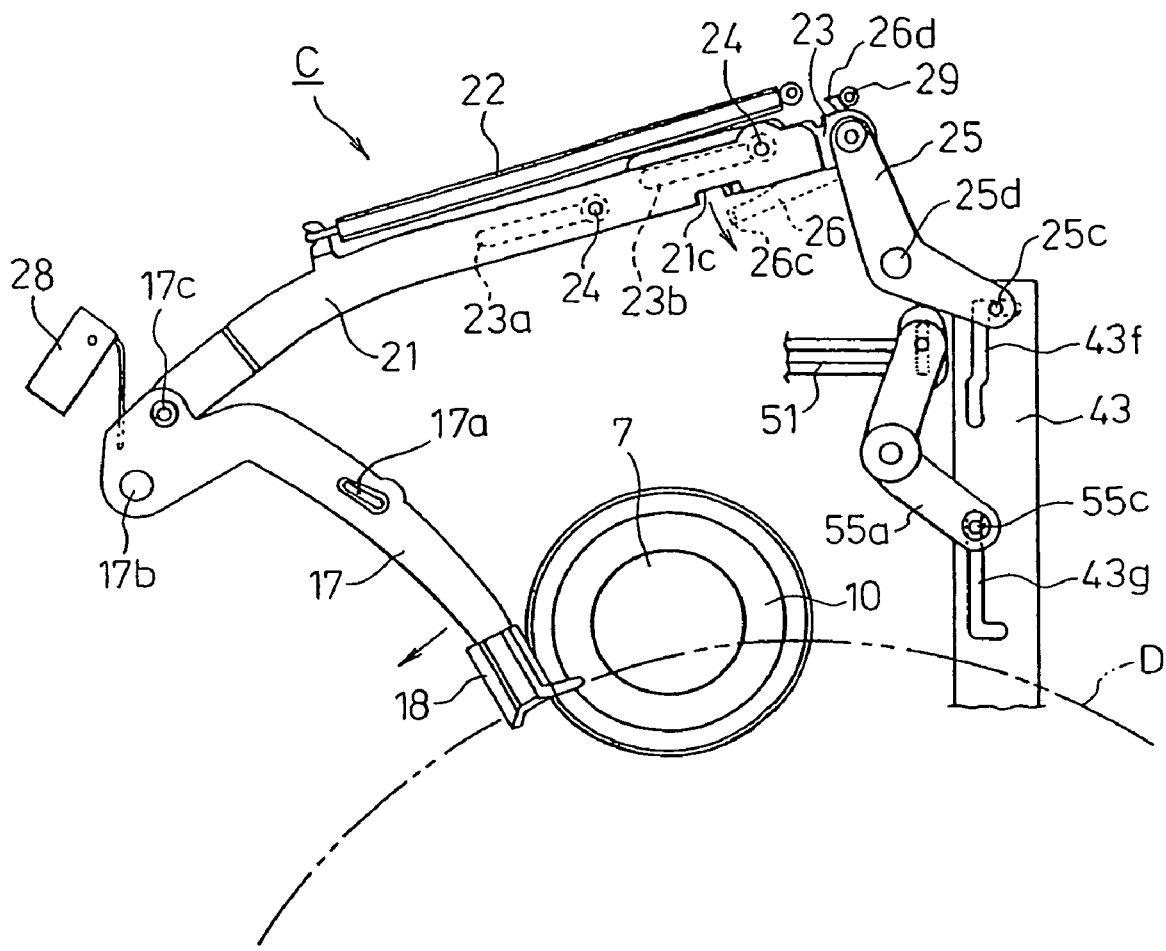
FIG. 29 is a view illustrating the operation when the disc support arm is unloaded.

The above-description is for the embodiment of the operation of the driving mechanism C when the disc D is loaded, when the unloading of the disc D, the driving mechanism C is operated in a reverse direction thereof and every mechanical component perform reverse operations. In other words, the loading mechanism is reversely driven to advance the rack main body 43, such that the disc supporting arm 17 pivots toward from the state illustrated in FIG. 28 to the state illustrated in FIG. 25, and at the state illustrated in FIG. 29, the rear end 26d of the lock lever 26 abuts on the starting pin 29. If the rack main body 43 advances again, the rear end 26d is pressed by the starting pin 29. Accordingly, the locking end 26c of the lock lever 26 is separated from the cut portions 21c and 23c of the first and second link arms 21 and 23 due to pivot, such that the lock state where the first link arm 21 is engaged with the second link arm 23 is released. At the same time, the elastic supporting force of the extension coil spring 22 is applied to the disc supporting arm 17, such that the disc supporting arm 17 pivots to the position illustrated in FIG. 23. Thus, the disc D is popped out from the slot 3a at a final moment of the final process to complete the unloading of the disc C.

As describe above, at the beginning of the disc loading process, the first and second link arms 21 and 23 are at a released state. As the disc D is loaded, the first and second link arms 21 and 23 are displaced in a direction of extension at first (from the state illustrated in FIG. 23 to the state illustrated in FIG. 24) and then, are displaced in a direction of shrinking (from the state illustrated in FIG. 24 to the state illustrated in FIG. 25), finally reached to the state illustrated in FIG. 25 to be locked by the lock lever 26. Meanwhile, at the beginning of the unloading of the disc D, the first and second link arms 21 and 23 are locked, so the first and second link arms 21 and 23 reach the state illustrated in FIG. 29 to be released by the lock lever 26 without the extension nor shrinking like the loading of the disc D. Moreover, when the disc D is unloaded, since almost unloading processes is driven and controlled by the carrying mechanism E, the unloading operation is always uniform, and the state where the disc D, at the ending time of the unloading, is stopped after being exposed from the slot 3a of the bezel 3 is uniform.

As described above, since the holder 18 of the tip of the disc supporting arm 17 is made of material with high friction coefficient, or the end holding portion 18a and the maintaining groove 18b are attached with silicon rubber and the like to apply a friction resistance to the disc, if the clamp by the clamp head 7 is released, the rotation of the disc D can be immediately stopped, such that the disc D is not pop out from the slot 31 in the rotation state.

Figure 30:
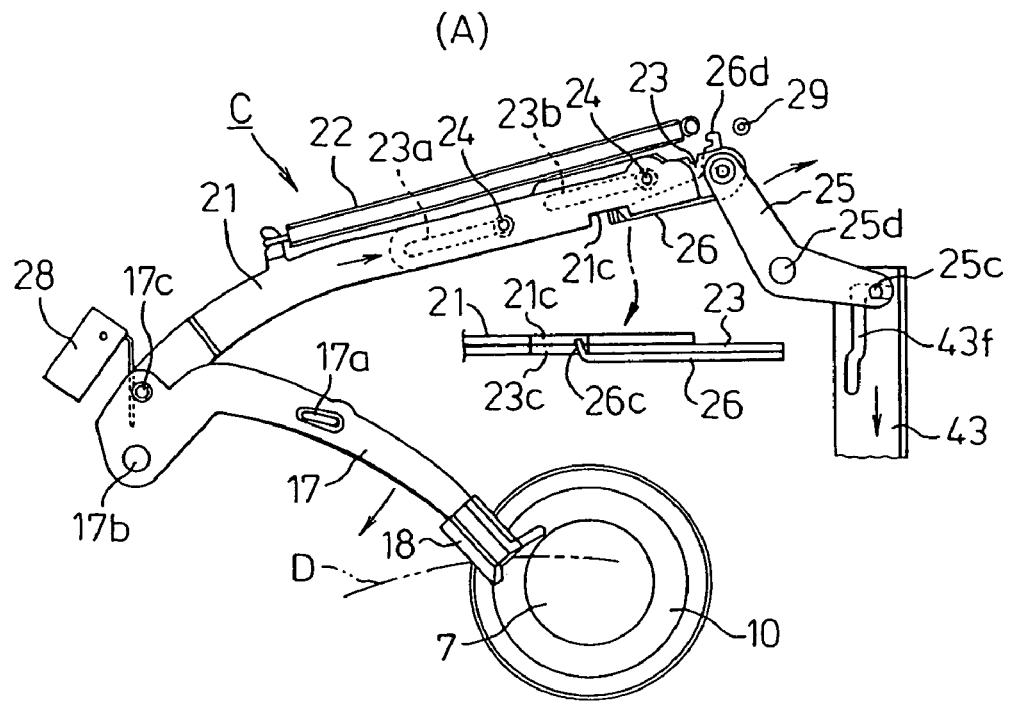
FIG. 30 is a view illustrating the function of the disc supporting arm.
Figure 30:
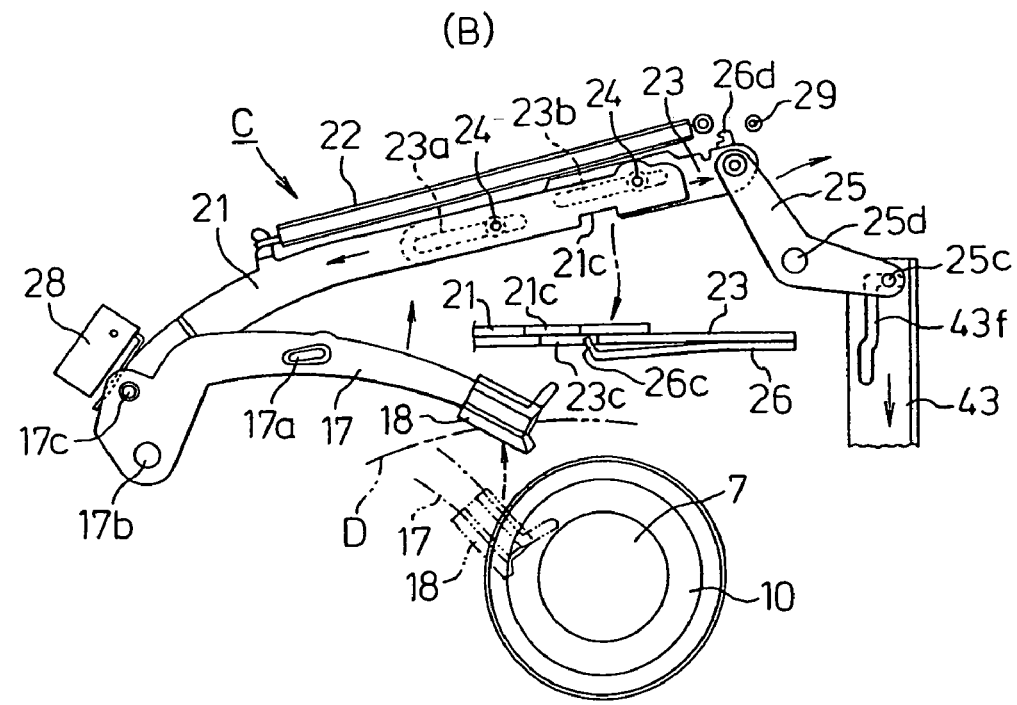

Next, as described as the object of the present invention as above, it will be described the embodiment to overcome the problem in the case in which the disc D is pushed back in the loading direction during the unloading of the disc D, such that the force in a negative direction is applied to the driving mechanism C. As illustrated in FIG. 30(A), during the unloading of the disc D, at the locked state where every mechanical components are driven in the solid line arrow direction, the locking end 26c of the lock lever 26 is located between the cut portions 21c and 23c of the first and second link arms 21 and 23, and the first and second link arms 21 and 23 are engaged, if, as illustrated in FIG. 30(B), the disc D is returned back by being pushed, the first and second link arms 21 and 23 slide in a facing direction.

Reached this state, as illustrated in the unloading drawing, FIG. 30(B), the cut portion 21c of the first link arm 21 climbs up the locking end 26c of the lock lever 26 and slides thereon, and the force in a negative direction of the disc D is absorbed into the sliding action. The force in a negative direction due to the disc D becomes great rotational moment result from which the holder 18 of the tip of the disc supporting arm 17 is pressed, and is transmitted to the driving mechanism D, but it is possible to prevent the damage caused by the force in a negative direction without affecting any part of the mechanical components in the above structure. Moreover, as illustrated in FIG. 30(B), in the case in which the disc D is returned by being pushed back, since the limit switch 28 is operated at that time, the disc D can be loaded inside the device by reversely operating the carrying mechanism E.

Figure 31:
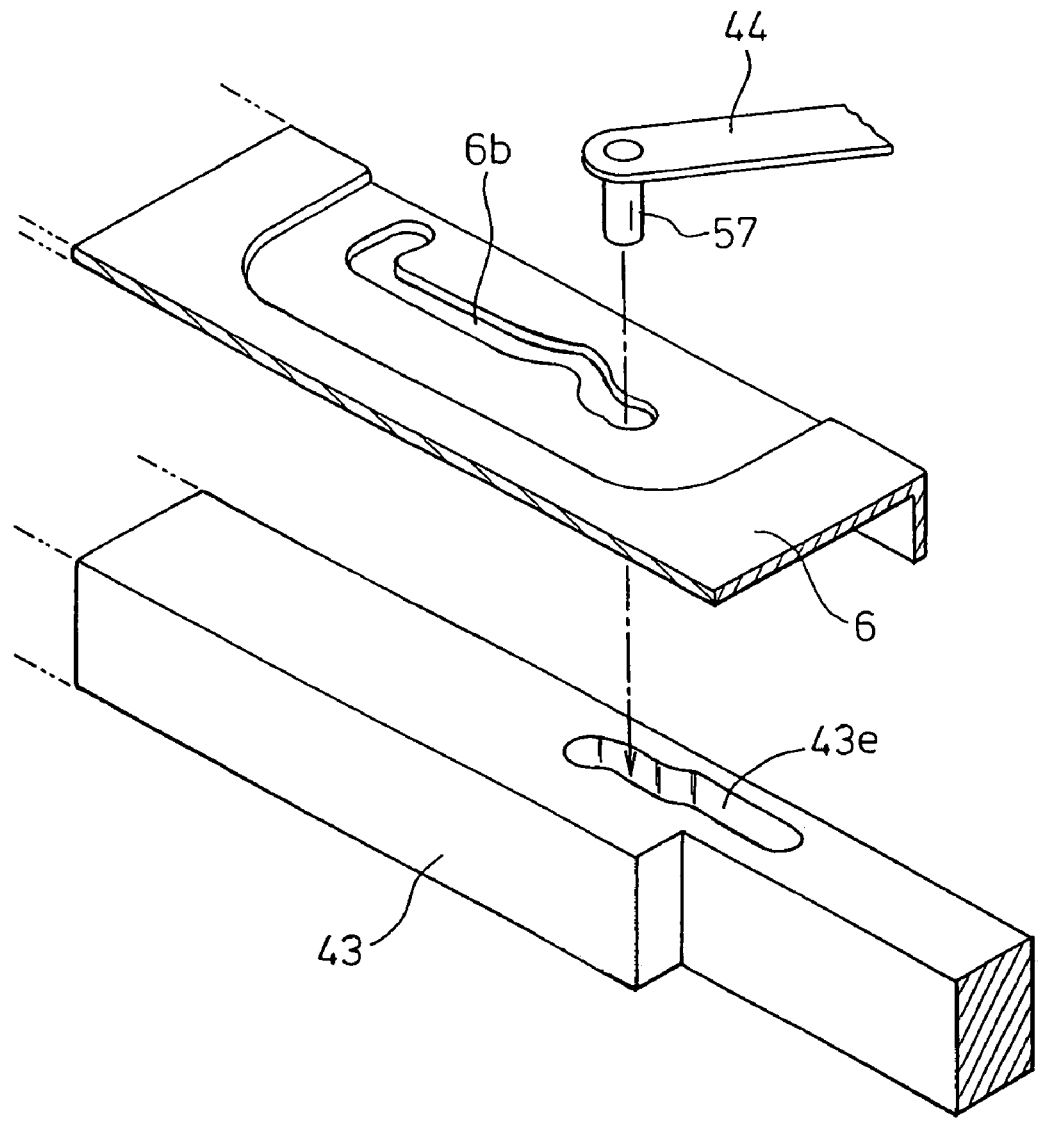
FIG. 31 is an exploded perspective view illustrating the structure of a mechanism for operating an introducing arm.

Next, the structure and operational embodiment of the introducing arm 50 driven by the rack main body 43 will be described bellow. FIG. 31 illustrates the mechanical structure that operates the introducing arm 50, the mechanism is constructed with a guide slit 6b formed at the base panel 6 placed where an introducing groove 43e formed at the rack main body 43 is overlapped, a driven pin 57 fixed at the tip of the lever arm 44 inserted into the introducing groove 43e and the guide slit 6b, and the guide slit 6b located at an prescribed position acts against the introducing groove 43e proceeding and receding so as to control the driven pin 57.

The introducing arm 50 is rotatably supported at the base end thereof by the pivot pin 58. The lever arm 44 is pivotally supported at the base end of the introducing arm 50, as described in FIG. 34. A maintaining groove is formed at a tip of the introducing arm 50, and a roller 60 is disposed inside the maintaining groove. Because of the structure as described above, the introducing arm 50 pivots within the chassis case 2 according to the operation of the lever arm 44 such that the disc D can be loaded in the device.

Figure 32:
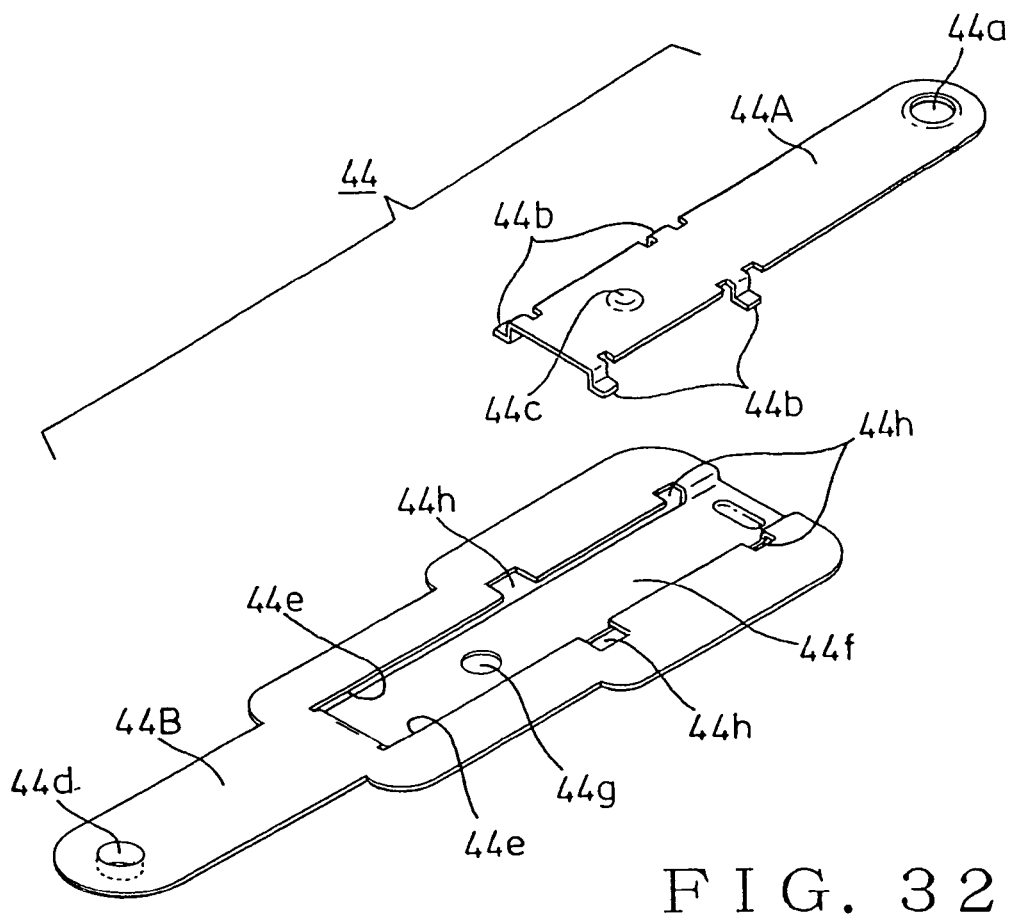
FIG. 32 is an exploded perspective view of a lever arm.

Meanwhile, the lever arm 44 for transmitting a driving force to the introducing arm 50, as illustrated in FIG. 32, comprises a slide piece 44A formed with a through-hole 44a that is supported to the pivot pin 59 of the introducing arm, locking pawls 44b, and a locking protrusion 44c protruded downwardly, and a supporting piece 44B formed with a through-hole 44d into which the driven pin 57 is fixed and having a guide groove 44f formed with a slit 44e at a side portion. A through-hole 44g, and cutting portions 44h facing the guide groove 44f are formed in a base plate of the guide groove 44f.

Figure 33:
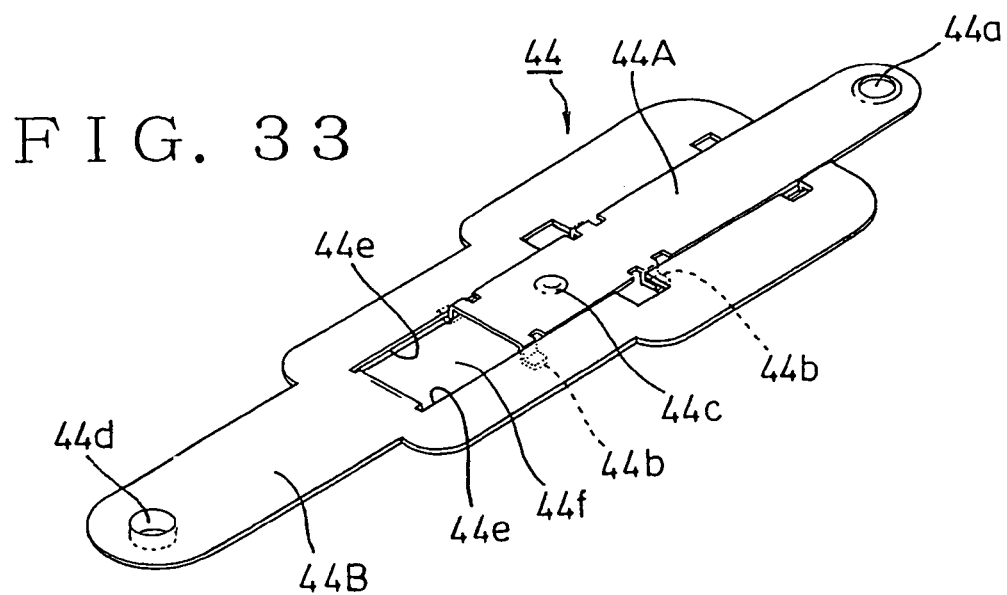
FIG. 33 is an assembly perspective view of the lever arm.

When the locking pawls 44b of the slide piece 44A are inserted into the cutting portions 44h of the supporting piece 44B, and is slightly slid forward, the locking pawls are locked in the slits 44e and the locking protrusion 44c is engaged with the through-hole 44g of the supporting piece 44B, as illustrated in FIG. 33, to be integrated. Therefore, the slide piece 44A and the supporting piece 44B can be extended or contracted against to each other, and a reference length of the lever arm is locked at a state of engagement of the locking protrusion 44c and the through-hole 44g.

Figure 34:
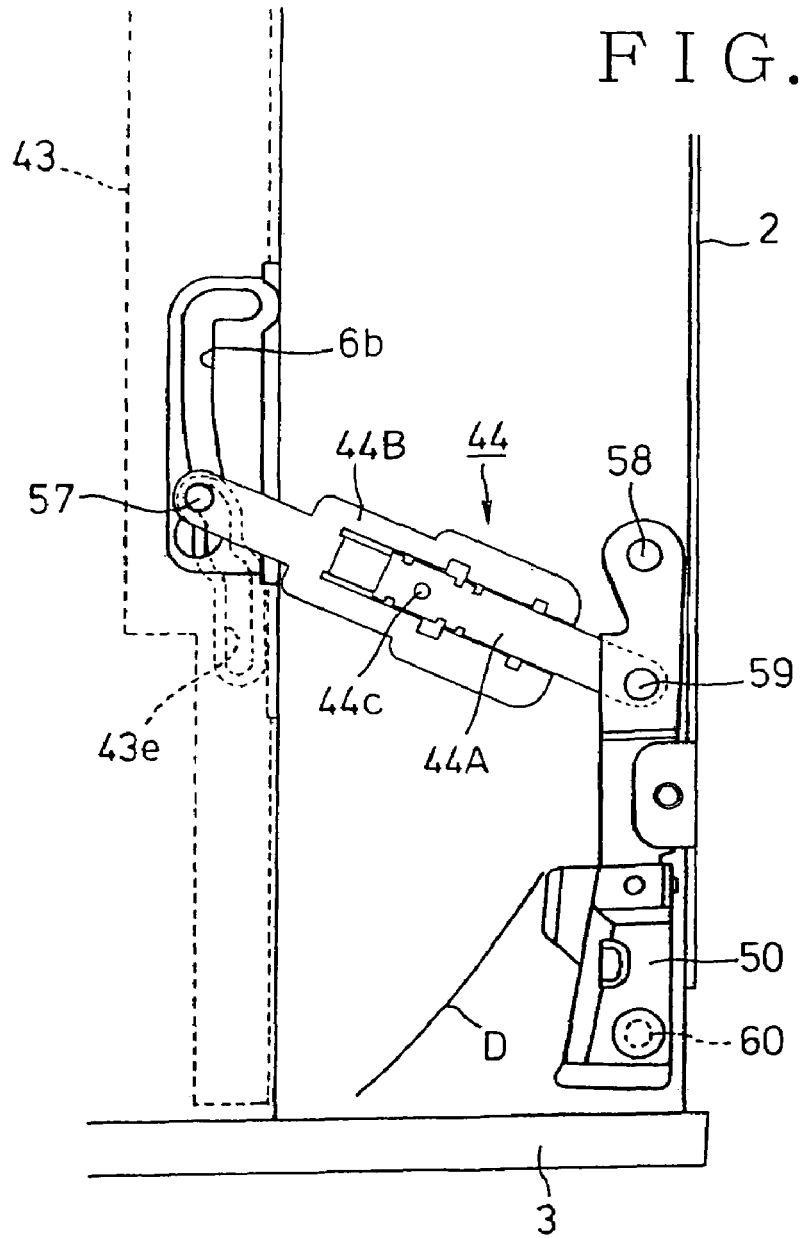
FIG. 34 is a view illustrating a first process of the operation of the introducing arm.
Figure 34:
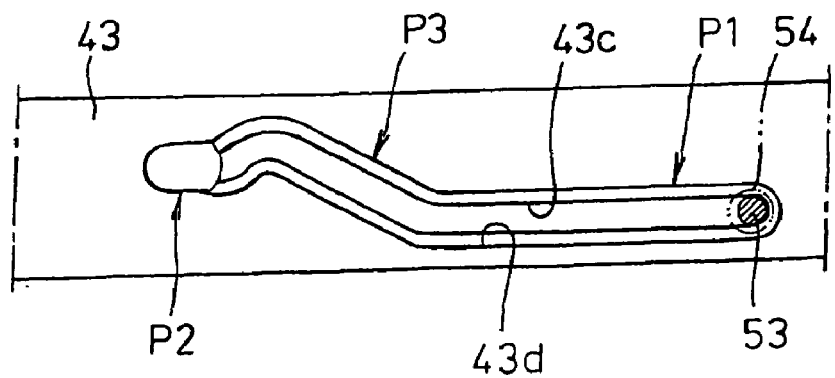

FIGS. 34 to 38 illustrate embodiments of the operation of the introducing arm 50 and will be described in accordance with the operation of the driven pin 53 guided within the cam groove 43c of the rack main body 43. FIG. 34 illustrates a state where the disc D is inserted into the disc device 1 by the operator, the disc supporting arm 17 pivots rearward by being pushed back and returned, and the first link arm 21 operates the limit switch 28 to be an initial state of starting the driving mechanism C. Therefore, the rack main body 43, as illustrated in same drawing, is located at the foremost end, and the driven pin 57 of the lever arm 44 is located at the rear end of the introducing groove 43e.

At this state, if the driving mechanism C is operated, as illustrated in FIG. 35, the rack main body 43 is started to retract. At that time, since the driven pin 57 is supported between a rear inclined face of the introducing groove 43e and a side wall of the guide slit 6b, the driven pin 57 retracts in accordance with the advance of the rack main body 43, and the introducing arm 50 pivots by traction of the lever arm 44, such that the disc D is supported by the disc supporting arm 44 and the loading of the disc D is started. At that time, the driven pin 53 moves along the horizontal portion of the lower portion P1 of the cam groove 43c and the height does not vary.

Figure 36:
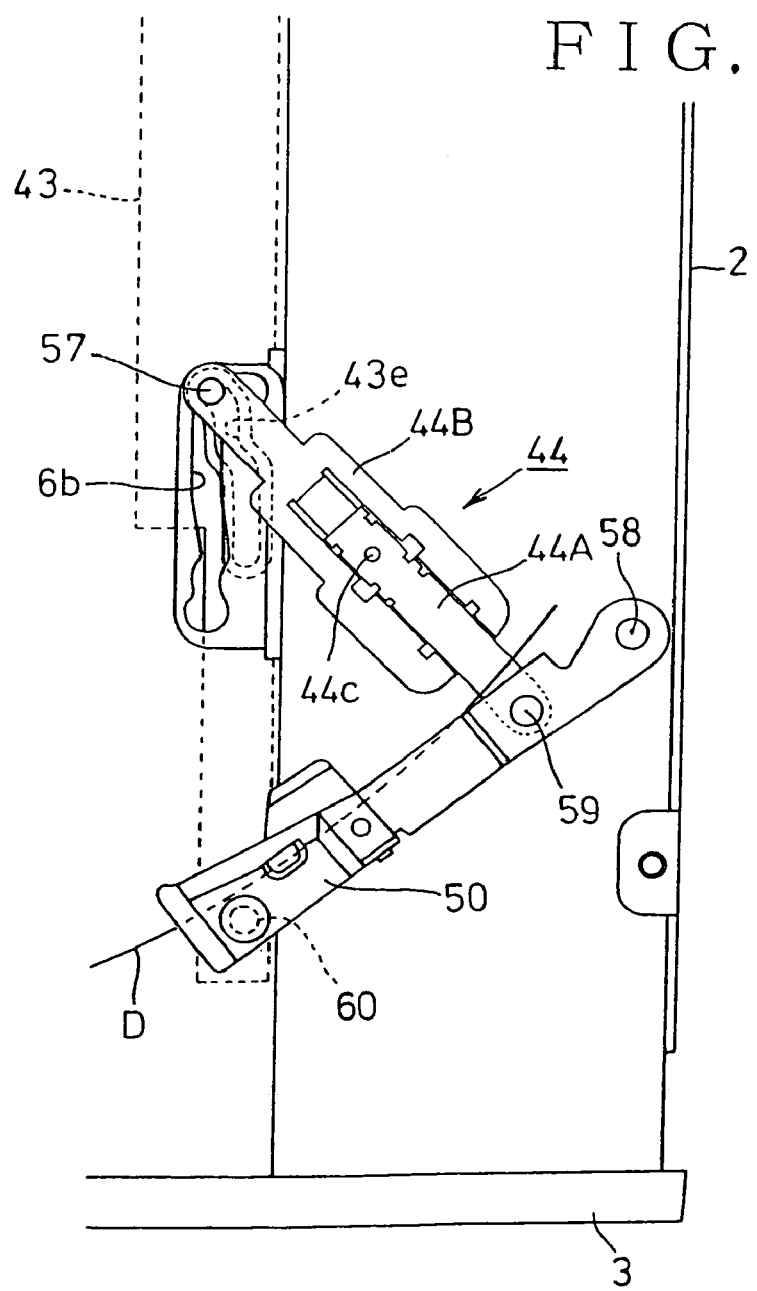
FIG. 36 is a view illustrating a third process of the operation of the introducing arm.
Figure 36:
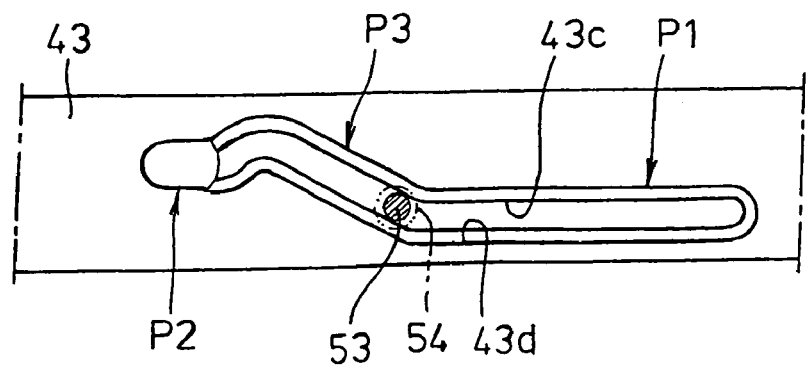

FIG. 36 illustrates a state where the rack main body 43 retracts again, such that the driven pin 57 reaches to a top portion of the guide slit 6b, at this state, the loading of the disc D keep going by the pivoting of introducing arm 50, and the central hole Da of the disc D reaches a position corresponding to the clamp head 7, and at that time, the driven pin 53 start to climb the ascending inclination of the inclined surface P3 of the cam groove 43c.

Figure 37:
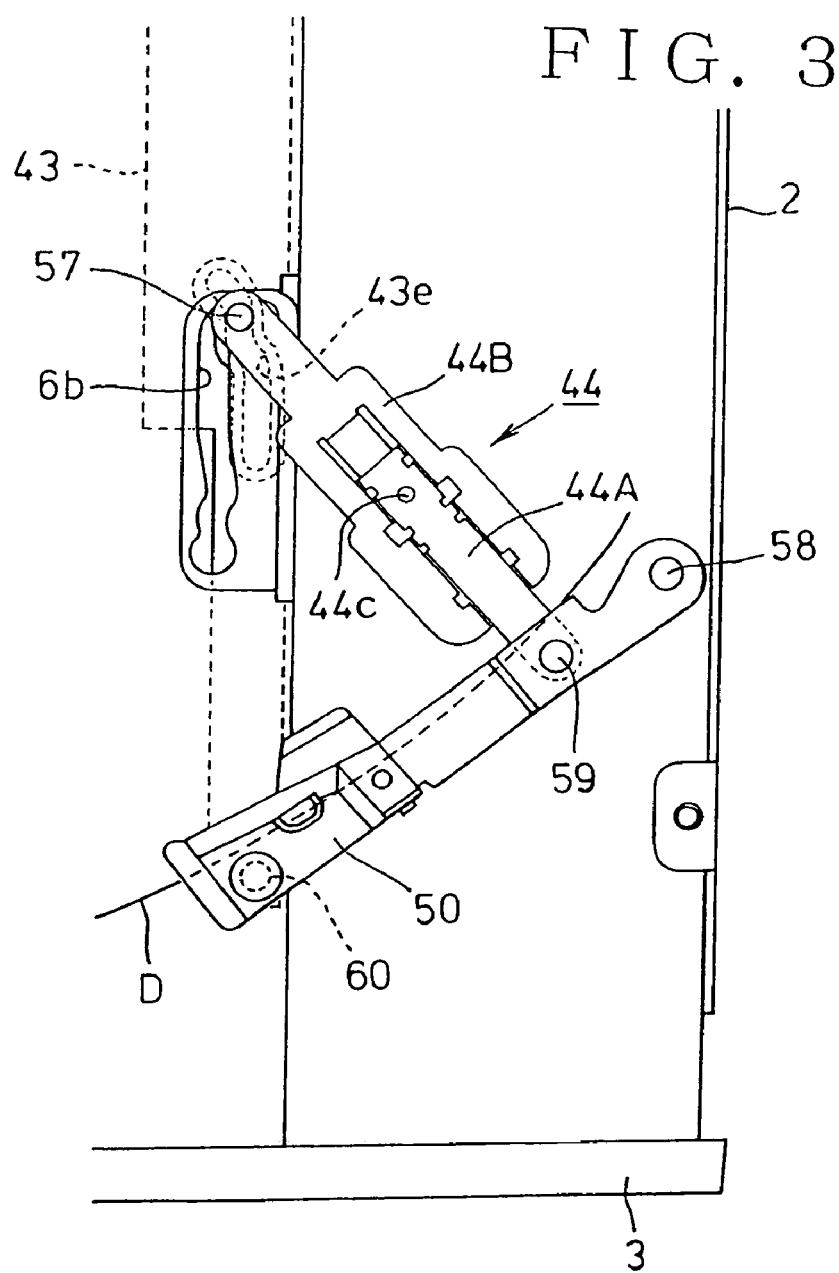
FIG. 37 is a view illustrating a fourth process of the operation of the introducing arm.
Figure 37:
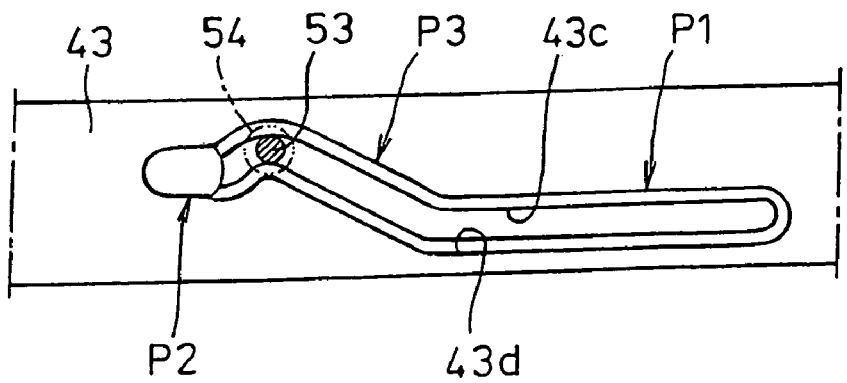

FIG. 37 illustrates a state where the rack main body 43 is slightly retracted from the position illustrated in FIG. 36 and the driven pin 57 is pushed and inserted into the longitudinal groove of the top portion of the guide slit 6b by the guide groove 43e. At that time, the driven pin 53 reaches the top portion of the inclined surface P3 of the cam groove 43c, and the clamp head 7 completes the clamp of the central hole Da of the disc D.

Figure 38:
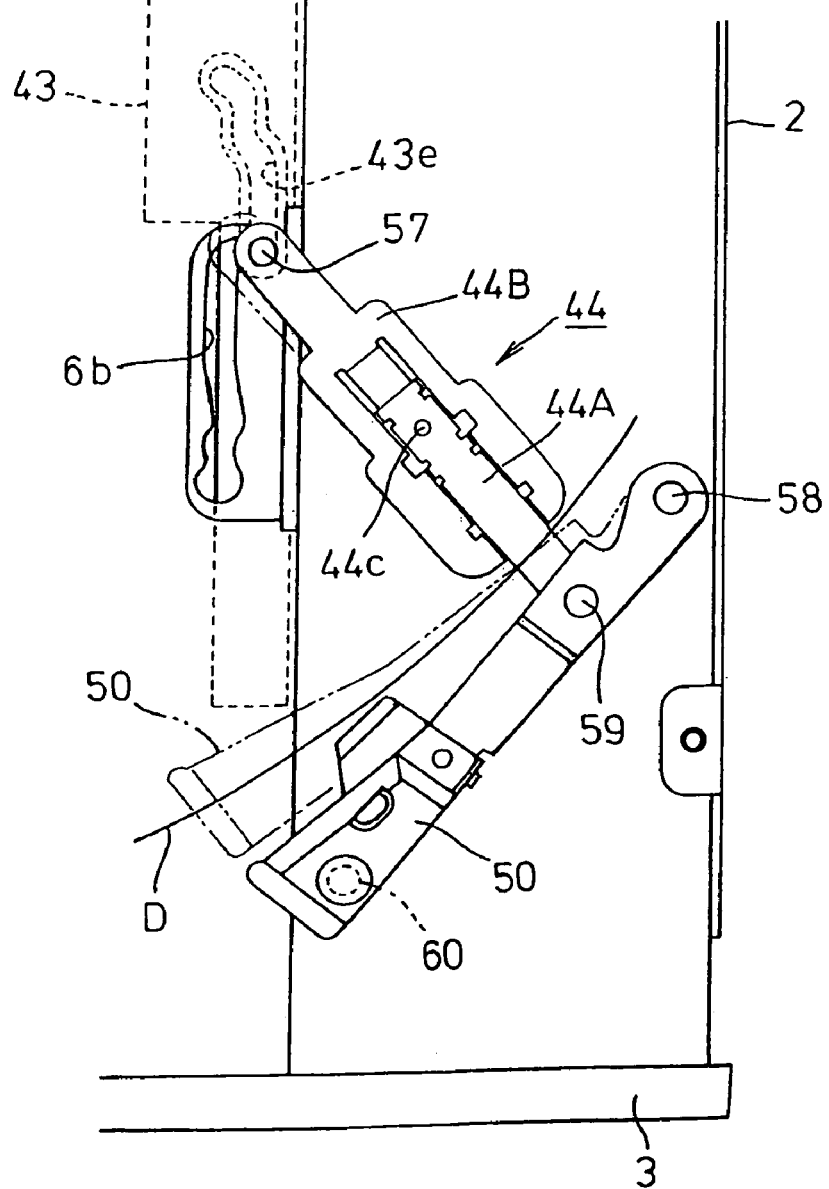
FIG. 38 is a view illustrating a fifth process of the operation of the introducing arm.
Figure 38:
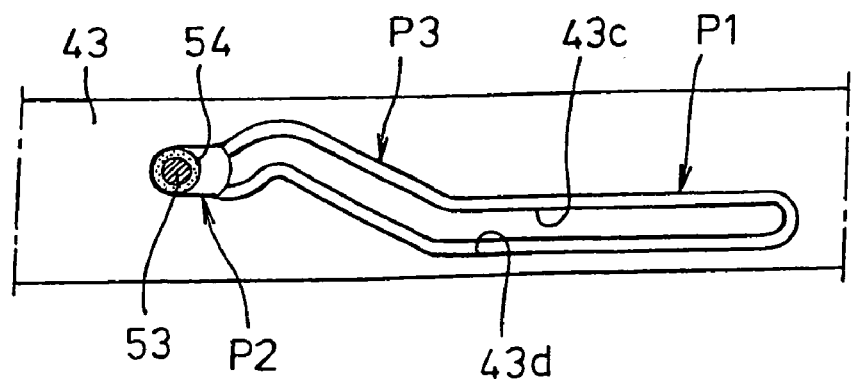
Figure 39:
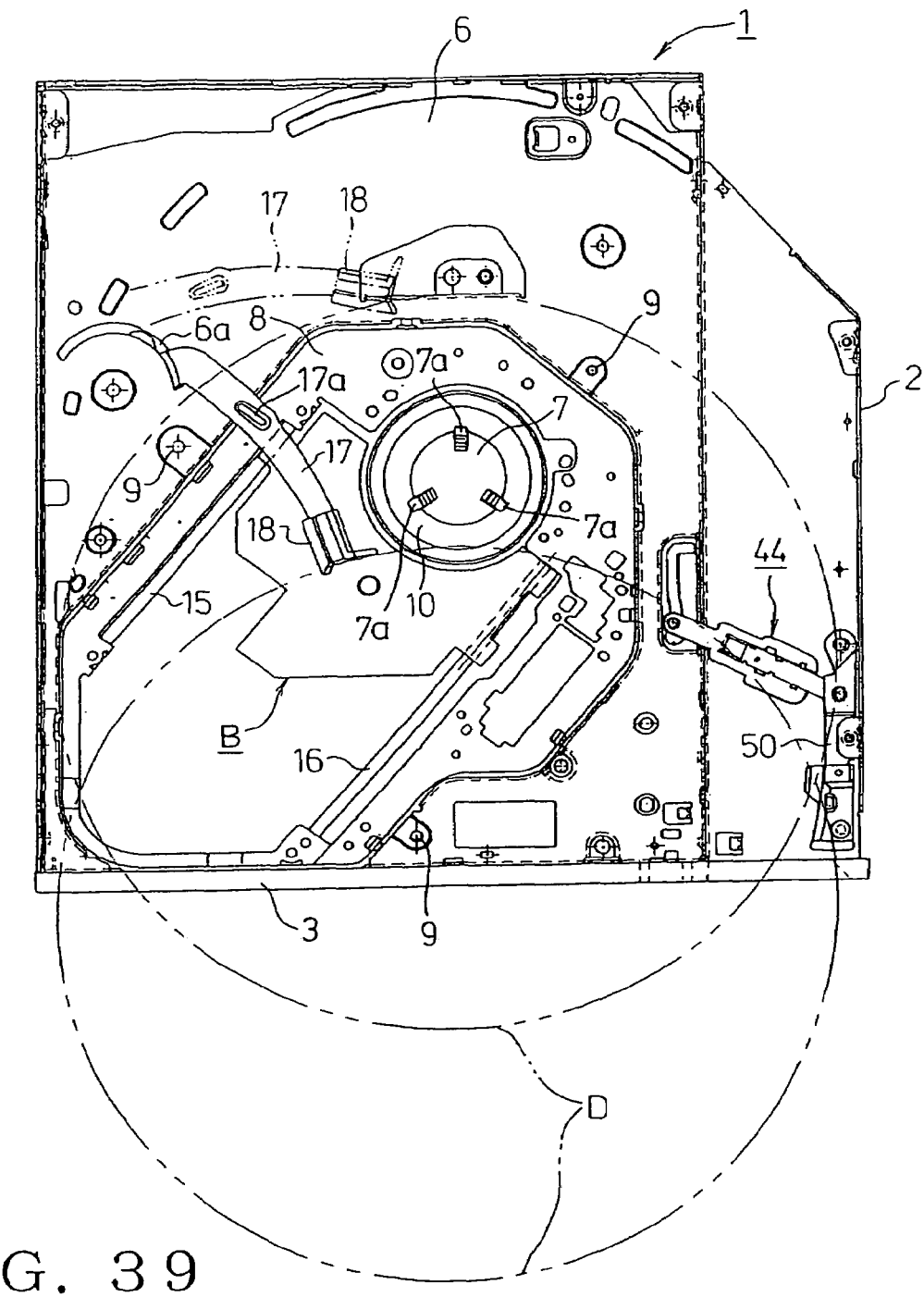
FIG. 39 is a view illustrating a first process of the loading of the disc.
Figure 39:
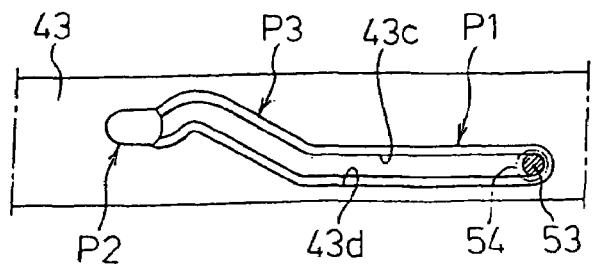
Figure 40:
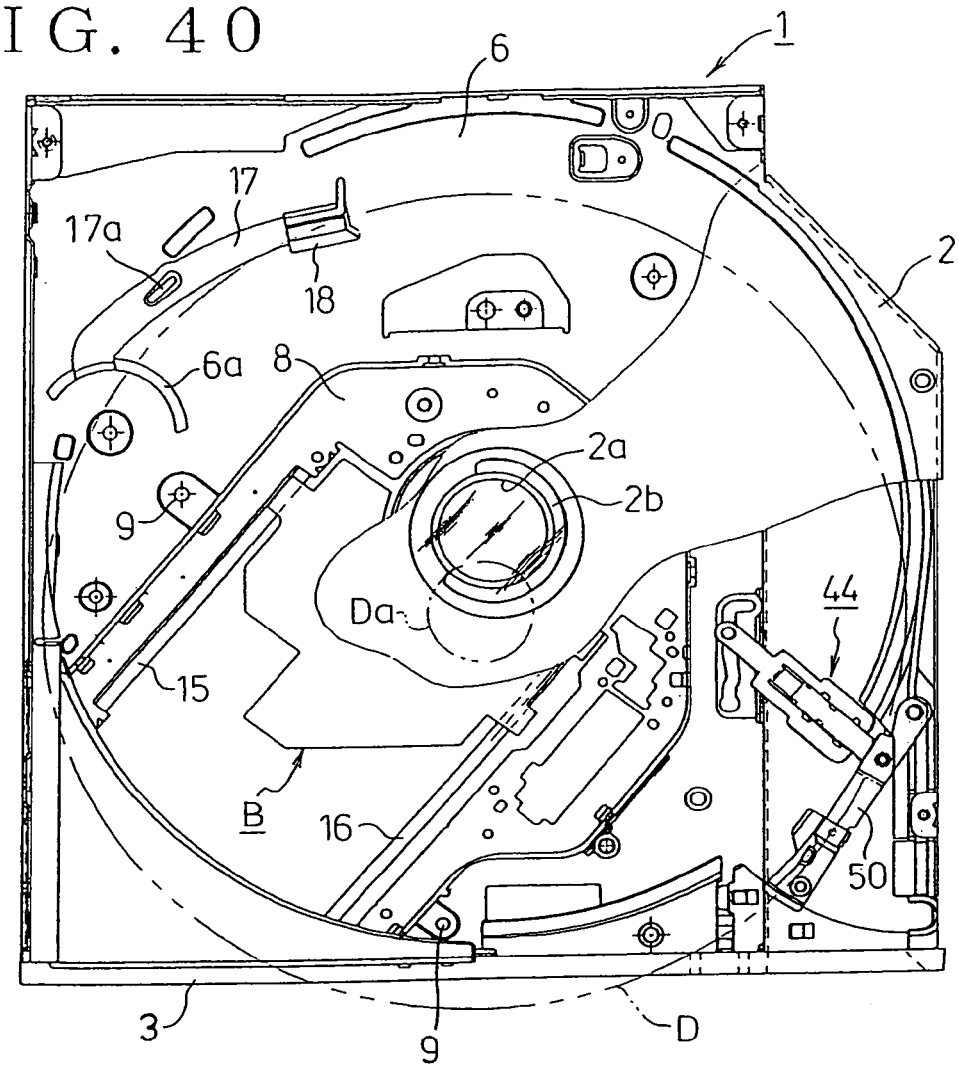
FIG. 40 is a view illustrating a second process of the loading of the disc.
Figure 40:
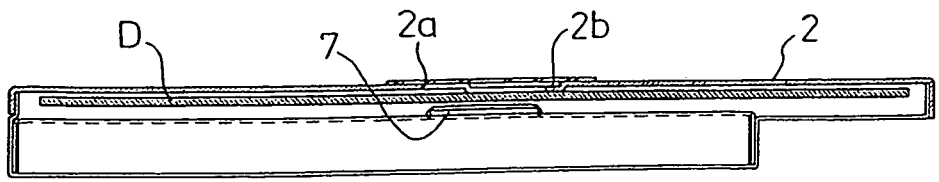
Figure 40:
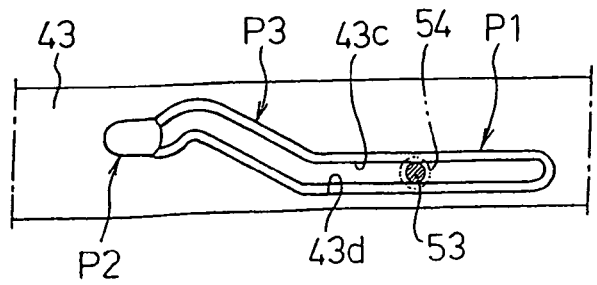
Figure 41:
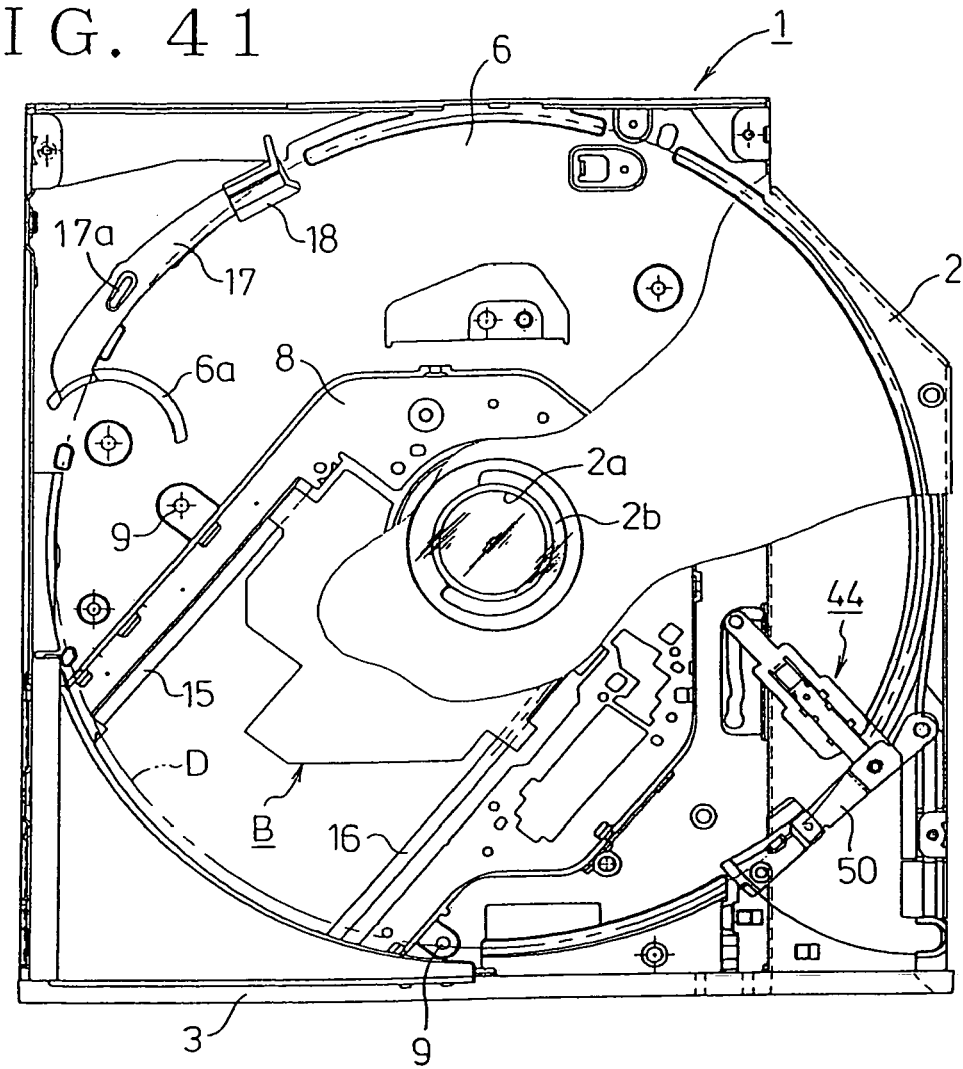
FIG. 41 is a plan view illustrating a third process of the loading of the disc.
Figure 41:
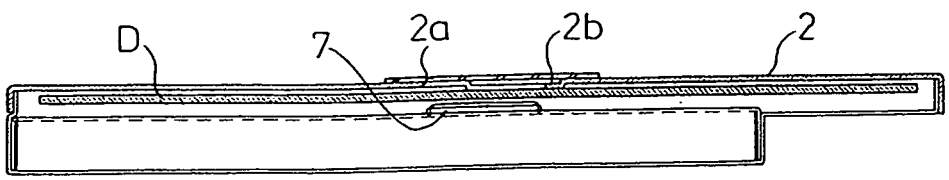
Figure 41:
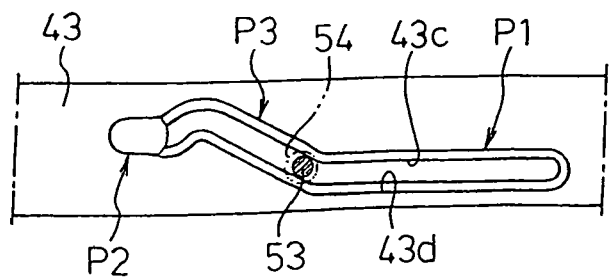
Figure 42:
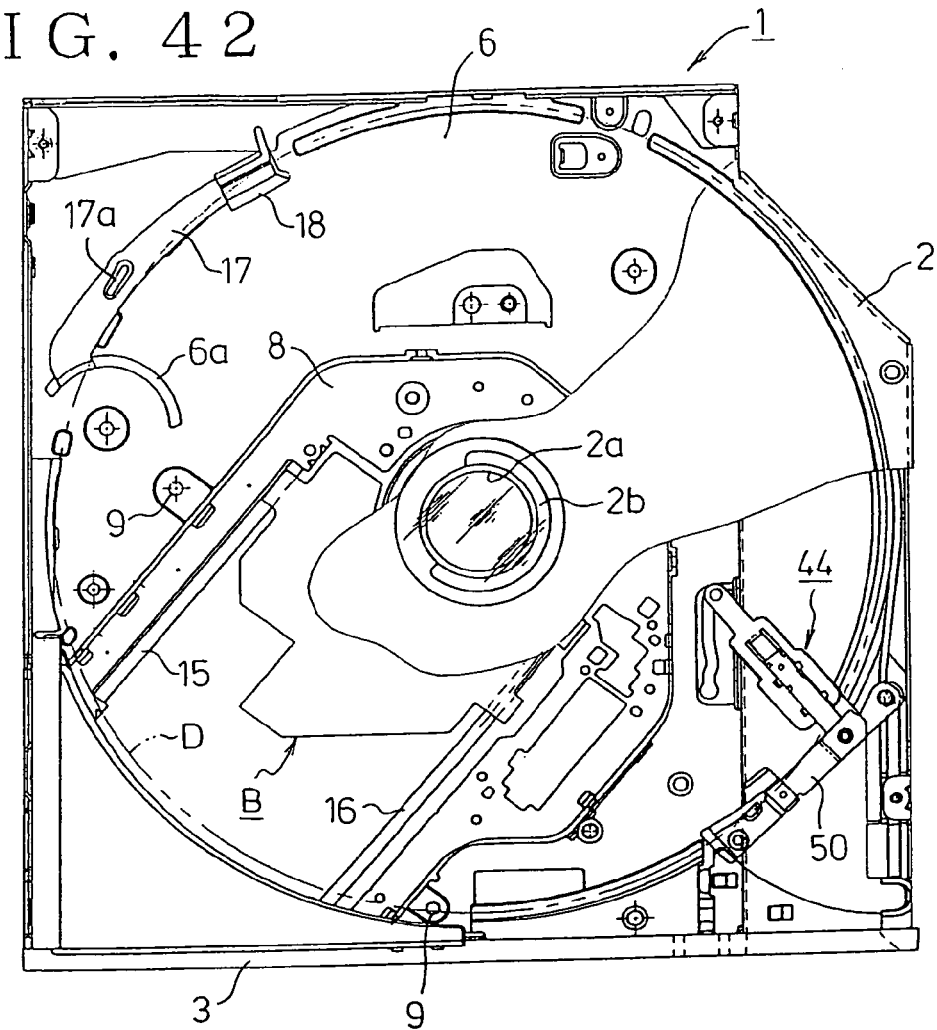
FIG. 42 is a view illustrating a fourth process of the loading of the disc.
Figure 42:
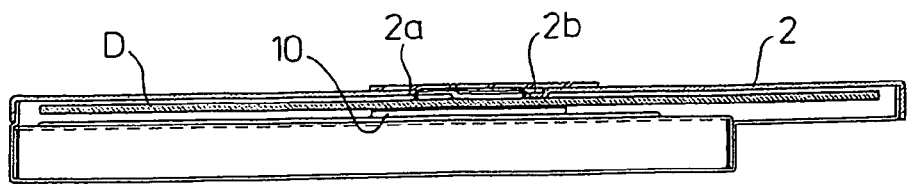
Figure 42:
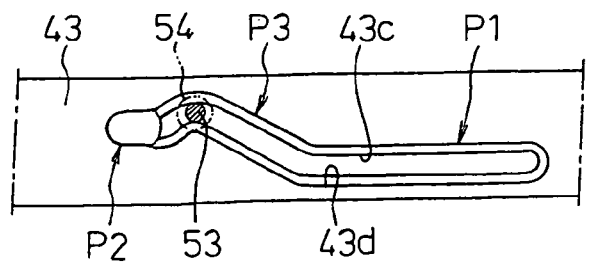
Figure 43:
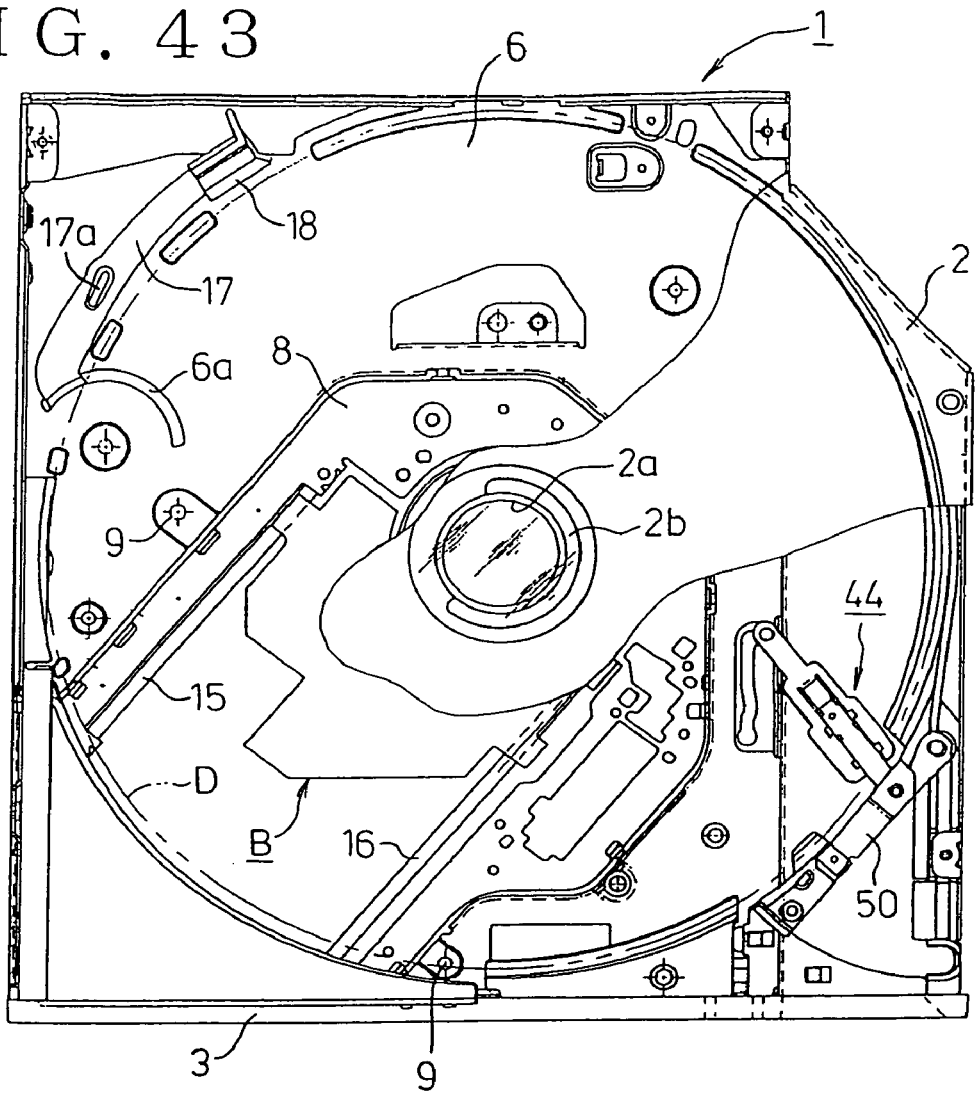
FIG. 43 is a view illustrating a fifth process of the loading of the disc.
Figure 43:
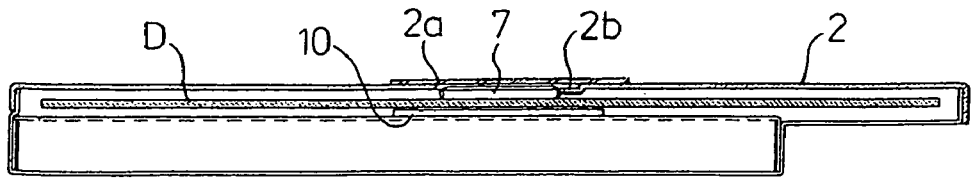
Figure 43:
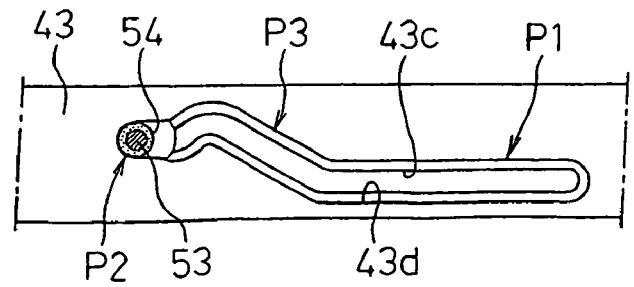

FIG. 38 illustrates a state where the rack main body 43 is retracted to the final position, during the process illustrated in FIG. 37 to FIG. 38, the driven pin 57 is pushed to insert more into the horizontal groove of the top portion of the guide slit 6b by a front longitudinal groove of the guide groove 43e. Therefore, the introducing arm 50 is slightly retracted from the position illustrated by a phantom line in the same drawing so as to release the disc D. At that time, the driven pin 53 is lowered from the top portion of the cam groove 43 to the higher portion P2, such that the disc D can be rotated.

FIGS. 39 to 43 show a state where the disc supporting arm 17 and the introducing arm 50 are synchronized and operated, it is corresponded to the description for the process illustrated in FIGS. 34 to 38.

Figure 44:
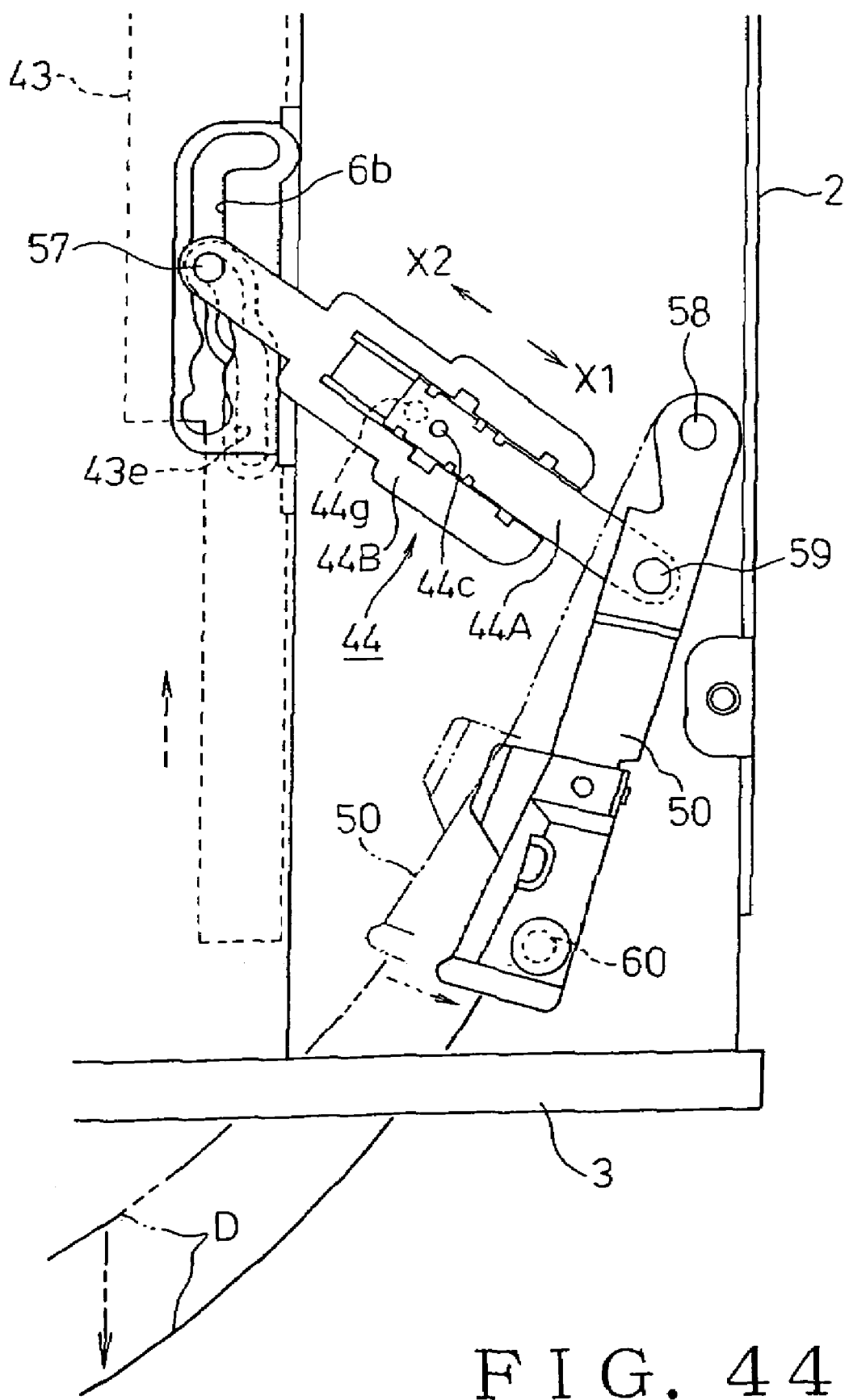
FIG. 44 is a view illustrating a first process of the loading of the disc.

Next, as described above as the object of the present invention, the operation to avoid the problem in the case in which, during the loading of the disc D, the disc D is pulled and returned in the direction of unloading, and the force in a negative direction is applied to the driving mechanism C, will be described. As illustrated in FIG. 44, in the loading process of the disc D, that is, in the state where the rack main body is retracted, the disc D is loaded to the position illustrated by the phantom line by the introducing arm 50. When the disc is pulled in the unloading direction and returned to reach to the position illustrated in solid line in the same drawing, thereby the introducing arm 50 pivots. At that time, the supporting piece 44B of the lever arm 44 is kept to move in the arrow X2 direction because of the state of keeping the traction by the rack main body 43, while the slide piece 44A moves in the arrow X1 direction according to the pivot of the introducing arm 50.

Figure 45:
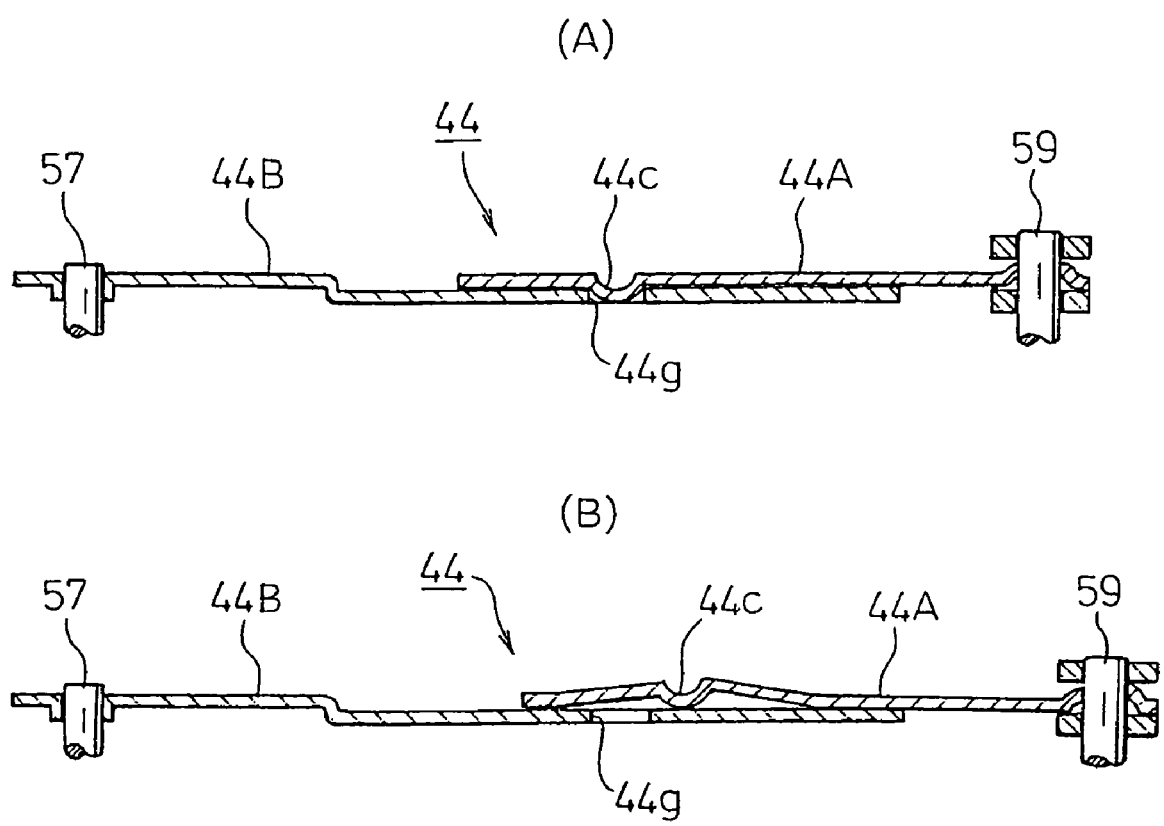
FIG. 45 is a sectional view illustrating the function of the lever arm.
Figure 46:
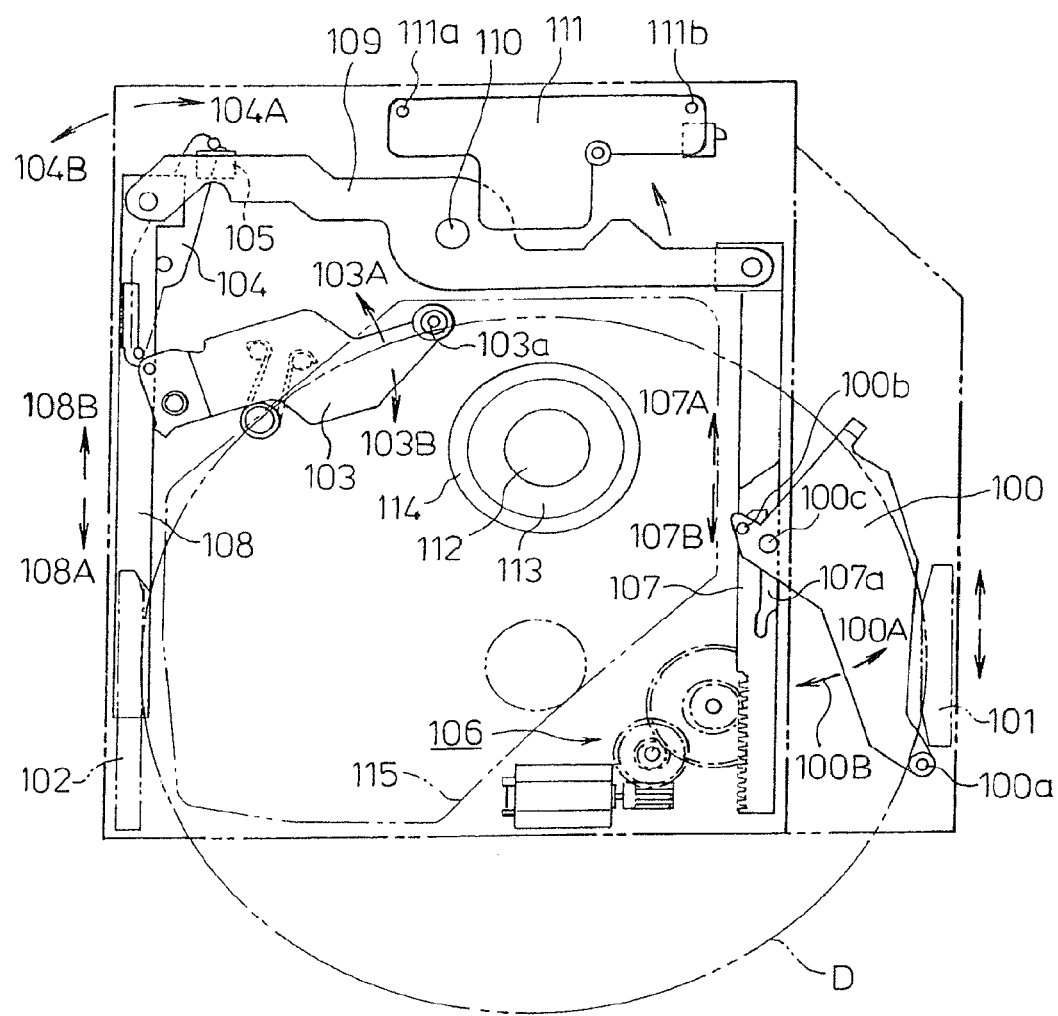
FIG. 46 is a view illustrating the structure of a conventional disc device.
Figure 47:
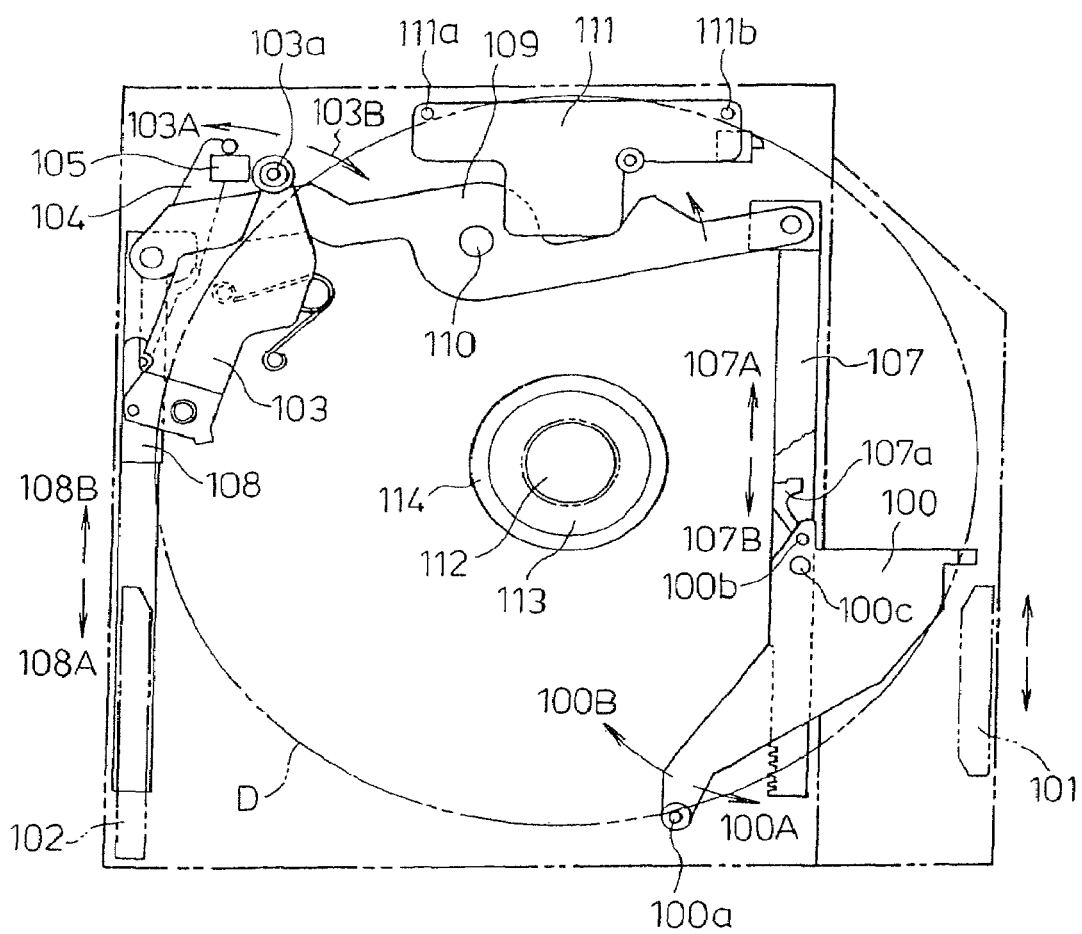
FIG. 47 is a view illustrating the structure of another conventional disc device.

At the state, since the slide piece 44A and the supporting piece 44B moved in the opposite directions to apply load more than a predetermined load at the engaged state of the locking protrusion 44c and the through-hole 44g illustrated in FIG. 45(A), the engagement state of being locked in the reference length as illustrated in FIG. 45(B) is released, such that the slide piece 44A slide in the arrow X1 direction. Therefore, the force in a negative direction generated to the lever arm from the introducing arm 50 by the manipulation to pulling and returning the disc D is absorbed by the sliding of the slide piece 44A. Therefore, the introducing arm 50, the lever arm 4 and the driving mechanism for driving them can be prevented from damage.

Therefore, if the damage of the disc D by the manipulation for the compulsory returning of the disc D is prevented, though a slight load is generated in the driving mechanism when the locking engagement of the locking protrusion 44c and the through-hole 44g is released, the load is detected by a predetermined means such as a torque sensor and the like to reverse the driving mechanism at that time, and the disc D can be reversed in the unloading direction. Moreover, in this case, though the slide piece 44A of the lever arm 44, as illustrated in FIG. 44, is extended from the normal state position, the supporting piece 44B is pushed and inserted into the slide piece 44A, such that the lever arm 44 is returned to the locked state in the reference length at the normal state.

Moreover, in the structure of the present invention as described above, the engagement state of the locking protrusion 44c and the through-hole 44g of the lever arm 44 is adjusted, such that the releasing timing of engagement state corresponding to the magnitude of the load can be adjusted. Also, in the embodiments, though the slide piece 44A and the supporting piece 44B are proposed as the thin plate shape, if the reference length of the lever arm 44 in the normal state can be the locked state and can be extended and contracted, it is to be understood that changes and variations may be made without departing from the spirit or scope of the invention.

REFERENCE NUMERALS

1: DISC DEVICE
2: CHASSIS CASE
3: BEZEL
4: PUSH BUTTON
5: INDICATOR
6: BASE PANEL
7: CLAMP HEAD
8: FRAME MEMBER
9: BUFFERING AND SUPPORTING STRUCTURE
10: TURN TABLE
11: SPINDLE MOTOR
12: OPTICAL PICKUP
13: CARRIER BLOCK
14, 15: GUIDE SHAFT
16: THREAD MOTOR
17: DISC SUPPORTING ARM

18: HOLDER
19: SUPPORTING PLATE
20: PIVOT PIN
21: FIRST LINK ARM
22: EXTENSION COIL SPRING
23: SECOND LINK ARM
24: RIVET PIN
25: PIVOT PIN
26: LOCKING LEVER
27: TORSION COIL SPRING
28: LIMIT SWITCH
29: STARTING PIN
30: LOADING MOTOR
31: WORM GEAR
32: DOUBLE GEAR
33: DOUBLE GEAR
34: DOUBLE GEAR
35: GEAR BASE
36: HOLDER
37: PIVOT PIN
38: COMPRESSION COIL SPRING
39: LIMIT SWITCH
40: SLIDE MEMBER
41: PIVOT PIN
42: EXTENSION COIL SPRING
43: RACK MAIN BODY
44: LEVER ARM
45: GEAR MEMBER
46: PRESSING PIN
47: DOUBLE GEAR
48: GEAR FRAME
49: OPERATING PIECE
50: INTRODUCING ARM
51: SLIDE MEMBER
52: SLIDE MEMBER
53: DRIVEN PIN
54: ELASTIC RING
55a: LINK
56b: LINK
55c: DRIVEN PIN
56: CLAMP PIN
57: DRIVEN PIN
58: PIVOT PIN
59: PIVOT PIN
60: ROLLER
A: DRIVING UNIT
B: HEAD UNIT
C: DRIVING MECHANISM
D: DISC
E: CARRYING MECHANISM

What is claimed is:

1. A disc device comprising:
an introducing arm for supporting a rear end of a disc in a loading direction of the disc and guiding the disc into the disc device;
a driving mechanism of the introducing device; and
a locking mechanism provided with an extendable and contractable lever arm for transmitting a driving power of the driving mechanism to the introducing arm,
wherein a reference length of the lever arm in a normal state of the disc device is locked state.

2. A disc device comprising:
an introducing arm for supporting a rear end of a disc in a loading direction of the disc and guiding the disc into the disc device;
a driving mechanism of the introducing device; and an extendable and contractable lever arm for transmitting a driving force of the driving mechanism to the introducing arm,
wherein, when a force greater than a predetermined force is applied to the introducing arm in an unloading direction, in a locked state where a reference length of the lever arm in a normal state of the disc device is locked, the locked state of the reference length of the lever arm is released.

* * * * *

UNITED STATES PATENT AND TRADEMARK OFFICE
CERTIFICATE OF CORRECTION

| | | |
|---|---|---|
| PATENT NO. | : 7,603,679 B2 | Page 1 of 1 |
| APPLICATION NO. | : 12/082357 | |
| DATED | : October 13, 2009 | |
| INVENTOR(S) | : Nobuhiko Fujimura | |

It is certified that error appears in the above-identified patent and that said Letters Patent is hereby corrected as shown below:

Column 2, line 8, "10a" should read --100a--;

Column 2, line 43, "the only the driving" should read --the only driving--;

Column 3, line 18, "mechanism. When" should read --mechanism when--;

Column 3, line 61, "achieve;" should read --achieve--;

Column 6, line 64, "first" should read --sixth--;

Column 11, line 38, "made descend" should read --made to descend--;

Column 11, line 53, "guide" should read --guided--;

Column 12, line 5, "made proceed" should read --made to proceed--;

Column 12, line 8, "form" should read --from--;

Column 12, line 45, "42" should read --43--;

Column 13, line 58, "nor" should read --or--;

Column 14, line 4, "pop" should read --popped--; and

Column 14, line 43, "an" should read --a--.

Signed and Sealed this
Eighth Day of March, 2011

David J. Kappos
*Director of the United States Patent and Trademark Office*